US011609821B2

(12) United States Patent
Behl et al.

(10) Patent No.: US 11,609,821 B2
(45) Date of Patent: Mar. 21, 2023

(54) METHOD AND SYSTEM FOR MANAGING FAULT RECOVERY IN SYSTEM-ON-CHIPS

(71) Applicant: NXP USA, Inc., Austin, TX (US)

(72) Inventors: Ankur Behl, New Delhi (IN); Neha Srivastava, New Delhi (IN)

(73) Assignee: NXP USA, Inc., Austin, TX (US)

( * ) Notice: Subject to any disclaimer, the term of this patent is extended or adjusted under 35 U.S.C. 154(b) by 189 days.

(21) Appl. No.: 17/039,576

(22) Filed: Sep. 30, 2020

(65) Prior Publication Data

US 2022/0100607 A1 Mar. 31, 2022

(51) Int. Cl.
*G06F 11/14* (2006.01)
*G06F 11/30* (2006.01)
*G06F 11/07* (2006.01)
*G06F 13/40* (2006.01)

(52) U.S. Cl.
CPC ...... *G06F 11/1441* (2013.01); *G06F 11/0757* (2013.01); *G06F 11/0772* (2013.01); *G06F 11/1415* (2013.01); *G06F 11/1474* (2013.01); *G06F 11/3072* (2013.01); *G06F 13/4027* (2013.01)

(58) Field of Classification Search
CPC ............. G06F 11/1441; G06F 11/0757; G06F 11/0772; G06F 11/1415; G06F 11/1474; G06F 11/3072; G06F 13/4027; G06F 13/4063
See application file for complete search history.

(56) References Cited

U.S. PATENT DOCUMENTS

| 6,898,732 | B1 | 5/2005 | Trebus et al. | |
|---|---|---|---|---|
| 7,054,987 | B1* | 5/2006 | Reed | G06F 13/16 710/52 |
| 7,373,555 | B2* | 5/2008 | Adkisson | G06F 11/0793 714/47.1 |
| 7,562,265 | B2 | 7/2009 | Azevedo et al. | |
| 8,868,941 | B2* | 10/2014 | Jayasimha | G06F 1/3287 713/320 |
| 10,819,680 | B1* | 10/2020 | Santan | H04L 63/0209 |
| 2005/0125695 | A1* | 6/2005 | Gilbert | G06F 11/0724 714/E11.131 |
| 2013/0262918 | A1* | 10/2013 | Nation | G06F 11/079 714/48 |
| 2013/0339663 | A1* | 12/2013 | Chang | G06F 13/14 712/29 |

(Continued)

*Primary Examiner* — Bryce P Bonzo
*Assistant Examiner* — Michael Xu

(57) ABSTRACT

A fault recovery system including a fault controller is disclosed. The fault controller is coupled between a processor and an interconnect, and configured to receive a time-out signal that is indicative of a failure of the processor to execute a transaction after a fault is detected in the processor. The failure in the execution of the transaction results in queuing of the interconnect. Based on the time-out signal, the fault controller is further configured to generate and transmit a control signal to the processor to disconnect the processor from the interconnect. Further, the fault controller is configured to execute the transaction, and in turn, dequeue the interconnect. When the transaction is successfully executed, the fault controller is further configured to generate a status signal to reset the processor, thereby managing a fault recovery of the processor.

23 Claims, 7 Drawing Sheets

(56) References Cited

U.S. PATENT DOCUMENTS

| | | | |
|---|---|---|---|
| 2015/0178166 A1* | 6/2015 | Park | G06F 11/0724 |
| | | | 714/23 |
| 2018/0157553 A1* | 6/2018 | Ryu | G06F 13/4282 |
| 2019/0079817 A1* | 3/2019 | Tomlin | G06F 11/1441 |
| 2021/0232521 A1* | 7/2021 | Kim | G06F 13/385 |

* cited by examiner

METHOD AND SYSTEM FOR MANAGING FAULT RECOVERY IN SYSTEM-ON-CHIPS

BACKGROUND

The present disclosure relates generally to electronic circuits, and, more particularly, to a method and a system for managing fault recovery in system-on-chips.

A system-on-chip (SoC) includes various processors (e.g., math accelerators, image processors, digital signal processors, or the like) that initiate various transactions with each other or with a system memory of the SoC. The SoC further includes an interconnect that couples the processors with each other and with the system memory, and facilitates execution of the transactions in a pipelined manner Typically, when a fault is detected in one processor, it is desirable to complete ongoing transactions associated with the faulty processor (i.e., transactions initiated before the fault is detected), disconnect the faulty processor from the interconnect, and execute a recovery (i.e., a reset) of the faulty processor without affecting operations of remaining processors, the interconnect, and the system memory. To manage a fault recovery of the processors, the SoC includes various fault recovery systems coupled between the processors and the interconnect. When the fault is detected in one processor, the associated fault recovery system enables the faulty processor to execute (i.e., complete) the associated transactions, and halts execution of any subsequent transactions associated with the faulty processor. Once the ongoing transactions are successfully executed, the fault recovery system disconnects the faulty processor from the interconnect and initiates the fault recovery of the faulty processor.

The conventional fault recovery system is heavily reliant on the faulty processor successfully executing (i.e., completing) the ongoing transactions, and efficiently manages the fault recovery as long as the faulty processor successfully executes the ongoing transactions. However, the faulty processor is unreliable and may function in an uncontrolled manner. For example, the faulty processor may become unresponsive and be unable to execute the ongoing transactions, thereby queuing the interconnect. In such a scenario, the SoC experiences a hang, and is required to be reset. As a result, a recovery time for the fault detected in one processor is significant (e.g., greater than 120 milliseconds). Further, the significant recovery time degrades a utilization of the SoC. Therefore, there exists a need for a technical solution that solves the aforementioned problems of the existing fault recovery systems.

SUMMARY

In one embodiment of the present disclosure, a fault recovery system is disclosed. The fault recovery system includes a fault controller that is coupled between a first processor and an interconnect. The fault controller is configured to receive a time-out signal that is indicative of a failure of the first processor to execute a first transaction after a fault is detected in the first processor. The failure in the execution of the first transaction results in queuing of the interconnect. The fault controller is further configured to generate and transmit, based on the time-out signal, a first control signal to the first processor to disconnect the first processor from the interconnect. The fault controller is further configured to perform, based on the time-out signal, at least one of first and second operations to execute the first transaction and dequeue the interconnect. Further, the fault controller is configured to generate, based on the execution of the first transaction, a status signal to reset the first processor, thereby managing a fault recovery of the first processor.

In another embodiment of the present disclosure, a system-on-chip (SoC) is disclosed. The SoC includes an interconnect, a plurality of processors, and a plurality of fault recovery systems coupled between the plurality of processors and the interconnect such that a first fault recovery system of the plurality of fault recovery systems is coupled between a first processor of the plurality of processors and the interconnect. The first fault recovery system includes a fault controller that is coupled between the first processor and the interconnect. The fault controller is configured to receive a time-out signal that is indicative of a failure of the first processor to execute a first transaction after a fault is detected in the first processor. The failure in the execution of the first transaction results in queuing of the interconnect. The fault controller is further configured to generate and transmit, based on the time-out signal, a first control signal to the first processor to disconnect the first processor from the interconnect. Further, the fault controller is configured to perform, based on the time-out signal, at least one of first and second operations to execute the first transaction and dequeue the interconnect. Based on the execution of the first transaction, the fault controller is further configured to generate a status signal to reset the first processor, thereby managing a fault recovery of the first processor.

In yet another embodiment, a fault recovery method for managing a fault recovery of a first processor by a fault recovery system that is coupled between the processor and an interconnect is disclosed. The fault recovery method includes receiving a time-out signal that is indicative of a failure of the first processor to execute a first transaction after a fault is detected in the first processor. The failure in the execution of the first transaction results in queuing of an interconnect of the SoC. The fault recovery method further includes generating and transmitting, based on the time-out signal, a first control signal to the first processor to disconnect the first processor from the interconnect. The fault recovery method further includes performing, based on the time-out signal, at least one of first and second operations to execute the first transaction and dequeue the interconnect. Further, the fault recovery method includes generating, based on the execution of the first transaction, a status signal to reset the first processor, thereby managing the fault recovery of the first processor.

In some embodiments, the fault recovery system further includes a timer that is coupled with the fault controller, and configured to generate a timer count such that the timer count is periodically decremented after a predetermined time duration.

In some embodiments, the fault controller is further configured to generate and transmit, after the fault is detected, a second control signal to the timer to activate the timer. The timer is further configured to generate the time-out signal when the timer count is equal to a threshold value. An equality of the timer count and the threshold value is indicative of the failure of the first processor to execute the first transaction.

In some embodiments, the fault recovery system further includes a diagnostic circuit that is coupled with the fault controller, and configured to generate diagnostic data associated with the fault recovery of the first processor that is managed by the fault controller. The diagnostic data includes an identifier, a memory address, and handshake information associated with the first transaction.

In some embodiments, the first transaction is initiated by the first processor with at least one of a system memory and a second processor before the fault is detected. The fault recovery system, the first processor, the interconnect, the system memory, and the second processor are integrated on a system-on-chip.

In some embodiments, the fault controller is further configured to receive a first fault signal that is indicative of the fault detected in the first processor. After the first fault signal is received by the fault controller and prior to the reception of the time-out signal by the fault controller, the fault controller is further configured to: (i) enable the first processor to execute the first transaction, (ii) receive a first command associated with a second transaction, (iii) halt an execution of the second transaction, and (iv) generate and transmit a third control signal that is indicative of the halt in the execution of the second transaction to the first processor. The second transaction is initiated by the first processor with at least one of the system memory and the second processor after the fault is detected.

In some embodiments, when the first transaction corresponds to a read transaction, the fault controller performs the first operation to execute the first transaction and dequeue the interconnect. The first operation corresponds to a reception of a first portion of first read data associated with the first transaction from the interconnect. A second portion of the first read data is received by the first processor from the interconnect before the fault is detected.

In some embodiments, when the first transaction corresponds to a write transaction, the fault controller performs the second operation to execute the first transaction and dequeue the interconnect. The second operation corresponds to generation and transmission of a first portion of first write data associated with the first transaction to the interconnect to write to at least one of the system memory and the second processor. A second portion of the first write data is written to at least one of the system memory and the second processor before the fault is detected.

In some embodiments, the first transaction is initiated by a second processor with the first processor before the fault is detected. The fault recovery system, the first processor, the interconnect, and the second processor are integrated on a system-on-chip.

In some embodiments, the fault controller is further configured to receive a second fault signal that is indicative of the fault detected in the first processor. After the second fault signal is received by the fault controller and prior to the reception of the time-out signal by the fault controller, the fault controller is further configured to: (i) enable the first processor to execute the first transaction, (ii) receive a second command associated with a third transaction, (iii) halt an execution of the third transaction, and (iv) generate and transmit a fourth control signal that is indicative of the halt in the execution of the third transaction to the interconnect. The third transaction is initiated by the second processor with the first processor after the fault is detected.

In some embodiments, when the first transaction corresponds to a read transaction, the fault controller performs the first operation to execute the first transaction and dequeue the interconnect. The first operation corresponds to generation and transmission of a first portion of second read data associated with the first transaction to the interconnect to provide to the second processor. A second portion of the second read data is provided to the second processor by the first processor before the fault is detected.

In some embodiments, when the first transaction corresponds to a write transaction, the fault controller performs the second operation to execute the first transaction and dequeue the interconnect. The second operation corresponds to a reception of a first portion of second write data associated with the first transaction from the interconnect. A second portion of the second write data is received by the first processor from the interconnect before the fault is detected.

Various embodiments of the present disclosure disclose a fault recovery system of a system-on-chip (SoC). The fault recovery system includes a fault controller that is coupled between a processor of the SoC and an interconnect of the SoC. The fault controller is configured to receive a time-out signal. The time-out signal is indicative of a failure of the processor to execute a transaction after a fault is detected in the processor. The failure in the execution of the transaction results in queuing of the interconnect. Based on the time-out signal, the fault controller is further configured to generate and transmit a control signal to the processor to disconnect the processor from the interconnect. Further, the fault controller is configured to execute (i.e., complete) the transaction, and in turn, dequeue the interconnect. When the transaction is successfully executed, the fault controller is further configured to generate a status signal to reset the processor, thereby managing a fault recovery of the processor.

Thus, when the processor fails to execute an ongoing transaction (i.e., the transaction initiated before the fault is detected) after the fault is detected in the processor, the ongoing transaction is executed (i.e., completed) by the fault recovery system of the present disclosure. Hence, the reliance on the processor (i.e., a faulty processor) for executing the ongoing transaction is eliminated, which in turn, ensures that a fault in one processor leads to a reset of exclusively the corresponding processor, and does not result in a reset of the SoC. As a result, a recovery time for the fault detected in one processor of the SoC that includes the fault recovery system of the present disclosure is significantly less as compared to a recovery time for a fault detected in a processor of an SoC including a conventional fault recovery system that is entirely reliant on a faulty processor to execute ongoing transactions. Consequently, a utilization of the SoC that includes the fault recovery system of the present disclosure is significantly higher than that of the SoC including the conventional fault recovery system. Thus, the fault recovery system of the present disclosure is more efficient and reliable as compared to the conventional fault recovery system.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
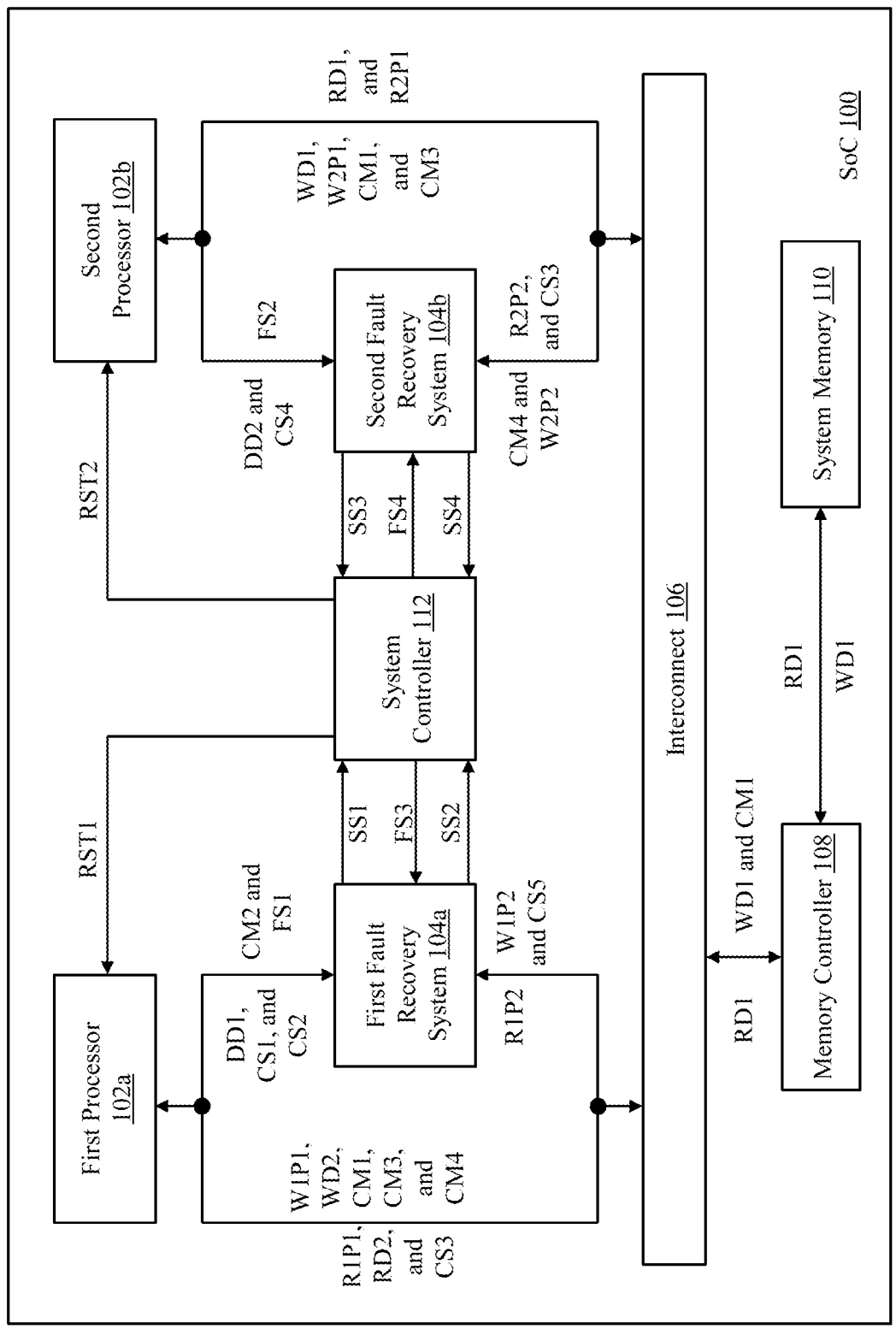
FIG. 1 illustrates a schematic block diagram of a system-on-chip (SoC) in accordance with an embodiment of the present disclosure.

FIG. 1 illustrates a schematic block diagram of a system-on-chip (SoC) 100 in accordance with an embodiment of the present disclosure. The SoC 100 is a multi-processor SoC that may be utilized in an automotive application (e.g., an advanced driver assistance system), a consumer application (e.g., a home security system), an industrial application (e.g., an industrial robotic system), or the like.

The SoC 100 includes first and second processors 102a and 102b, first and second fault recovery systems 104a and 104b, and an interconnect 106. The first and second processors 102a and 102b are collectively referred to as a "plurality of processors 102a and 102b", and the first and second fault recovery systems 104a and 104b are collectively referred to as a "plurality of fault recovery systems 104". The plurality of fault recovery systems 104 are coupled between the plurality of processors 102 and the interconnect 106 such that the first fault recovery system 104a is coupled between the first processor 102a and the interconnect 106, and the second fault recovery system 104b is coupled between the second processor 102b and the interconnect 106. Additionally, the first and second processors 102a and 102b are directly coupled with the interconnect 106. The SoC 100 further includes a memory controller 108 that is coupled with the interconnect 106, and a system memory 110 that is coupled with the memory controller 108. Further, the SoC 100 includes a system controller 112 that is coupled with the first and second processors 102a and 102b, and the first and second fault recovery systems 104a and 104b.

The first processor 102a is configured to initiate various transactions with at least one of the system memory 110 and the second processor 102b by generating various commands associated with the corresponding transactions. Further, the first processor 102a is configured to transmit the generated commands to the interconnect 106 for providing to at least one of the system memory 110 and the second processor 102b. The first processor 102a is further configured to execute (i.e., complete) the initiated transactions.

When the initiated transactions correspond to read transactions, the first processor 102a is further configured to execute the initiated transactions by receiving associated read data from the interconnect 106. The associated read data may be provided to the interconnect 106 by at least one of the memory controller 108 and the second processor 102b. Similarly, when the initiated transactions correspond to write transactions, the first processor 102a is further configured to execute the initiated transactions by generating and transmitting associated write data to the interconnect 106. The associated write data is then written to at least one of the system memory 110 and the second processor 102b (i.e., a first memory (not shown) associated with the second processor 102b).

The first processor 102a is further configured to initiate a first set of transactions with at least one of the system memory 110 and the second processor 102b by generating a first set of commands (not shown), respectively. The first processor 102a is further configured to transmit the first set of commands to the interconnect 106 for providing to at least one of the system memory 110 and the second processor 102b. When the first set of transactions correspond to read transactions, the first processor 102a is further configured to execute the first set of transactions by receiving a first set of read data (not shown) from the interconnect 106, respectively. Similarly, when the first set of transactions correspond to write transactions, the first processor 102a is further configured to execute the first set of transactions by generating and transmitting a first set of write data (not shown) to the interconnect 106, respectively.

The first processor 102a is similarly configured to initiate first and second transactions with at least one of the system memory 110 and the second processor 102b by generating first and second commands CM1 and CM2, respectively. In an example, the first transaction is initiated after the initiation of the first set of transactions and before the initiation of the second transaction.

The first processor 102a is further configured to transmit the first command CM1 to the interconnect 106. For the sake of ongoing discussion, it is assumed that during the execution of the first transaction and prior to the initiation of the second transaction, a first fault is detected in the first processor 102a. The first fault corresponds to an error in an operation of the first processor 102a. Examples of the first fault may include a memory fault, a state machine fault, or the like. In such a scenario, the first processor 102a may be configured to generate a first fault signal FS1 indicative of the first fault detected in the first processor 102a. In an embodiment, an activated state (i.e., a logic high state) of the first fault signal FS1 indicates that the first fault is detected in the first processor 102a. In another embodiment, a deactivated state (i.e., a logic low state) of the first fault signal FS1 indicates that the first fault is detected in the first processor 102a.

As the first fault is detected during the execution of the first transaction, it is assumed that a portion of the first transaction is executed. For example, when the first transaction corresponds to a read transaction, the first processor 102a is further configured to receive, from the interconnect 106 before the first fault is detected, a first portion of first read data RD1 associated with the first transaction. The first portion of the first read data RD1 is hereinafter referred to and designated as the "first read data portion R1P1". The first read data portion R1P1 may be stored in at least one of the system memory 110 and the first memory, and may be retrieved and transmitted to the interconnect 106 before the first fault is detected by at least one of the memory controller 108 and the second processor 102b, respectively. Similarly, when the first transaction corresponds to a write transaction, the first processor 102a is further configured to generate and transmit, to the interconnect 106 before the first fault is detected, a first portion of first write data WD1 associated with the first transaction to write to at least one of the system memory 110 and the second processor 102b (i.e., the first memory). The first portion of the first write data WD1 is hereinafter referred to and designated as the "first write data portion W1P1".

Upon the detection of the first fault, the first processor 102a is further configured to transmit the second command CM2 associated with the second transaction (i.e., a transaction initiated after the first fault is detected) to the first fault recovery system 104a. In such a scenario, the first processor 102a is enabled to execute (i.e., complete) the first transaction and the execution of the second transaction is halted. Thus, in response to the transmission of the second command CM2, the first processor 102a is further configured to receive, from the first fault recovery system 104a, a first control signal CS1 indicative of the halt in the execution of the second transaction. In an embodiment, an activated state (i.e., a logic high state) of the first control signal CS1 is indicative of the halt in the execution of the second transaction. In another embodiment, a deactivated state (i.e., a logic low state) of the first control signal CS1 is indicative of the halt in the execution of the second transaction.

If the first processor 102a fails to execute the first transaction within a first predetermined time duration (not shown), the interconnect 106 is queued. The queuing of the interconnect 106 corresponds to accumulation of data associated with various transactions in the interconnect 106. In such a scenario, the first processor 102a is further configured to receive a second control signal CS2 from the first fault recovery system 104a, and based on the second control signal CS2, the first processor 102a is disconnected from the interconnect 106. In an embodiment, when the second control signal CS2 is activated (i.e., is at a logic high state), the first processor 102a is disconnected from the interconnect 106. In another embodiment, when the second control signal CS2 is deactivated (i.e., is at a logic low state), the first processor 102a is disconnected from the interconnect 106.

The execution of the first transaction is then attempted by the first fault recovery system 104a. If the first fault recovery system 104a is unable to execute the first transaction within a second predetermined time duration (not shown), the SoC 100 is reset. Conversely, if the first transaction is successfully executed by the first fault recovery system 104a within the second predetermined time duration, the interconnect 106 is dequeued. In an embodiment, the first and second predetermined time durations are equal. In another embodiment, the first and second predetermined time durations are unequal.

When the first transaction corresponds to a read transaction, the successful execution of the first transaction by the first fault recovery system 104a corresponds to a reception of a second portion of the first read data RD1 associated with the first transaction from the interconnect 106. The second portion of the first read data RD1 is hereinafter referred to and designated as the "second read data portion R1P2". The second read data portion R1P2 may be stored in at least one of the system memory 110 and the first memory, and may be retrieved and transmitted to the interconnect 106 after the first fault is detected by at least one of the memory controller 108 and the second processor 102b, respectively. Similarly, when the first transaction corresponds to a write transaction, the successful execution of the first transaction by the first fault recovery system 104a corresponds to generation and transmission of a second portion of the first write data WD1 associated with the first transaction to the interconnect 106 to write to at least one of the system memory 110 and the second processor 102b (i.e., the first memory). The second portion of the first write data WD1 is hereinafter referred to and designated as the "second write data portion W1P2". For the sake of ongoing discussion, it is assumed that the first and second read data portions R1P1 and R1P2 constitute the first read data RD1, and the first and second write data portions W1P1 and W1P2 constitute the first write data WD1.

Although it is described that the first and second read data portions R1P1 and R1P2 and the first and second write data portions W1P1 and W1P2 constitute the first read data RD1 and the first write data WD1, respectively, the scope of the present disclosure is not limited to it. In various other embodiments, when the first processor 102a is enabled to execute (i.e., complete) the first transaction, another portion of the first transaction may be executed by the first processor 102a prior to the lapse of the first predetermined time duration, without deviating from the scope of the present disclosure. For example, the first processor 102a may be configured to receive a third portion (not shown) of the first read data RD1 from the interconnect 106 when the first transaction corresponds to a read transaction. Similarly, when the first transaction corresponds to a write transaction, the first processor 102a may be further configured to generate and transmit a third portion (not shown) of the first write data WD1 to the interconnect 106. In such a scenario, the first and second read data portions R1P1 and R1P2 and the third portion of the first read data RD1 constitute the first read data RD1, and the first and second write data portions W1P1 and W1P2 and the third portion of the first write data WD1 constitute the first write data WD1.

If the first processor 102a successfully executes the first transaction within the first predetermined time duration, the first processor 102a is further configured to receive, from the first fault recovery system 104a until the first processor 102a is reset, a first error response (not shown) for each subsequent transaction (e.g., a second set of transactions) initiated by the first processor 102a after the execution of the first transaction. The first error response is generated in accordance with a protocol associated with the first processor 102a. In such a scenario, it will be apparent to a person skilled in the art that when the first transaction corresponds to a read transaction, the successful execution of the first transaction by the first processor 102a corresponds to a reception of the second read data portion R1P2 from the interconnect 106. Similarly, when the first transaction corresponds to a write transaction, the successful execution of the first transaction by the first processor 102a corresponds to generation and transmission of a fourth portion (not shown) of the first write data WD1 to the interconnect 106 such that the first write data portion W1P1 and the fourth portion of the first write data WD1 constitute the first write data WD1.

Upon the successful execution of the first transaction, by the first processor 102a or the first fault recovery system 104a, the first processor 102a is further configured to receive a first reset signal RST1 from the system controller 112. The first processor 102a is reset based on the received first reset signal RST1. In an embodiment, when the first reset signal RST1 is activated (i.e., is at a logic high state), the first processor 102a is reset. In another embodiment, when the first reset signal RST1 is deactivated (i.e., is at a logic low state), the first processor 102a is reset.

The first processor 102a is further configured to receive, upon the reset, first diagnostic data DD1 from the first fault recovery system 104a. The first diagnostic data DD1 includes a first identifier, a first memory address, and first handshake information associated with the first transaction. The first diagnostic data DD1 may further include additional information that indicates whether the first transaction is executed (i.e., completed) by the first processor 102a or the first fault recovery system 104a. Based on the first diagnostic data DD1, the first processor 102a is further configured to perform various post-recovery operations. For example, the first processor 102a may be configured to reinitiate the first transaction if the first transaction is executed by the first fault recovery system 104a.

The first processor 102a is similarly configured to initiate third and fourth transactions with the second processor 102b by generating third and fourth commands CM3 and CM4, respectively. The first processor 102a is further configured to transmit the third and fourth commands CM3 and CM4 to the interconnect 106. In an example, the third transaction is initiated after the initiation of the first set of transactions and before the initiation of the fourth transaction. For the sake of ongoing discussion, it is assumed that during the execution of the third transaction and prior to the initiation of the fourth transaction, a second fault is detected in the second processor 102b. The second fault corresponds to an error in an operation of the second processor 102b. Examples of the second fault may include a memory fault, a state machine fault, or the like.

As the second fault is detected during the execution of the third transaction, it is assumed that a portion of the third transaction is executed. For example, when the third transaction corresponds to a read transaction, the first processor 102a is further configured to receive, from the interconnect 106 before the second fault is detected, a first portion of second read data RD2 associated with the third transaction. The first portion of the second read data RD2 is hereinafter referred to and designated as the "third read data portion R2P1". The third read data portion R2P1 may be stored in the first memory, and may be retrieved and transmitted to the interconnect 106 by the second processor 102b before the second fault is detected. Similarly, when the first transaction corresponds to a write transaction, the first processor 102a is further configured to generate and transmit, to the interconnect 106 before the first fault is detected, a first portion of second write data WD2 associated with the third transaction to write to the second processor 102b (i.e., the first memory). The first portion of the second write data WD2 is hereinafter referred to and designated as the "third write data portion W2P1".

Upon the detection of the second fault, the first processor 102a is further configured to generate and transmit, to the interconnect 106, a second portion of the second write data WD2 associated with the third transaction to write to the second processor 102b (i.e., the first memory). The second portion of the second write data WD2 is hereinafter referred to and designated as the "fourth write data portion W2P2". Further, upon detection of the second fault, the second processor 102b is enabled to execute (i.e., complete) the third transaction and the execution of the fourth transaction is halted. Thus, in response to the transmission of the fourth command CM4, the first processor 102a is further configured to receive, from the second fault recovery system 104b by way of the interconnect 106, a third control signal CS3 indicative of a halt in the execution of the fourth transaction. In an embodiment, an activated state (i.e., a logic high state) of the third control signal CS3 is indicative of the halt in the execution of the fourth transaction. In another embodiment, a deactivated state (i.e., a logic low state) of the third control signal CS3 is indicative of the halt in the execution of the fourth transaction.

If the second processor 102b fails to execute the third transaction within a third predetermined time duration (not shown), the interconnect 106 is queued. In such a scenario, the execution of the third transaction is attempted by the second fault recovery system 104b. If the second fault recovery system 104b is unable to execute the third transaction within a fourth predetermined time duration (not shown), the SoC 100 is reset. Conversely, if the third transaction is successfully executed by the second fault recovery system 104b within the fourth predetermined time duration, the interconnect 106 is dequeued. In an embodiment, the third and fourth predetermined time durations are equal. In another embodiment, the third and fourth predetermined time durations are unequal.

When the third transaction corresponds to a read transaction, the successful execution of the third transaction by the second fault recovery system 104b corresponds to generation and transmission of a second portion of the second read data RD2 associated with the third transaction to the interconnect 106 for providing to the first processor 102a. The second portion of the second read data RD2 is hereinafter referred to and designated as the "fourth read data portion R2P2". The first processor 102a is thus further configured to receive, from the interconnect 106 after the second fault is detected, the fourth read data portion R2P2. In one embodiment, the first processor 102a may be configured to discard the fourth read data portion R2P2. When the third transaction corresponds to a write transaction, the successful execution of the third transaction by the second fault recovery system 104b corresponds to a reception of the fourth write data portion W2P2 from the interconnect 106. For the sake of ongoing discussion, it is assumed that the third and fourth read data portions R2P1 and R2P2 constitute the second read data RD2, and the third and fourth write data portions W2P1 and W2P2 constitute the second write data WD2.

Although it is described that the third and fourth read data portions R2P1 and R2P2 and the third and fourth write data portions W2P1 and W2P2 constitute the second read data RD2 and the second write data WD2, respectively, the scope of the present disclosure is not limited to it. In various other embodiments, when the second processor 102b is enabled to execute (i.e., complete) the third transaction, another portion of the third transaction may be executed by the second processor 102b prior to the lapse of the third predetermined time duration, without deviating from the scope of the present disclosure. For example, a third portion (not shown) of the second write data WD2 may be received by the second processor 102b from the interconnect 106 when the third transaction corresponds to a read transaction. Similarly, when the third transaction corresponds to a write transaction, a third portion (not shown) of the second read data RD2 may be retrieved and transmitted by the second processor 102b to the interconnect 106. In such a scenario, the third and fourth read data portions R2P1 and R2P2 and the third portion of the second read data RD2 constitute the second read data RD2, and the third and fourth write data portions W2P1 and W2P2 and the third portion of the second write data WD2 constitute the second write data WD2.

If the second processor 102b successfully executes the third transaction within the third predetermined time duration, the first processor 102a is further configured to receive a second error response (not shown) for each subsequent transaction (e.g., a third set of transactions) initiated by the first processor 102a with the second processor 102b after the execution of the third transaction. The first processor 102a receives the second error response for each subsequent transaction from the second fault recovery system 104b by way of the interconnect 106 until the second processor 102b is reset. The second error response is generated in accordance with a protocol associated with the second processor 102b. In such a scenario, it will be apparent to a person skilled in the art that when the third transaction corresponds to a read transaction, the successful execution of the third transaction by the second processor 102b corresponds to retrieval and transmission of a fourth portion (not shown) of the second read data RD2 to the interconnect 106 such that the third read data portion R2P1 and the fourth portion of the second read data RD2 constitute the second read data RD2. Similarly, when the third transaction corresponds to a write transaction, the successful execution of the third transaction by the second processor 102b corresponds to a reception of the second write data portion W2P2 from the interconnect 106.

The second processor 102b is configured to receive various commands generated by the first processor 102a for initiating various transactions with the second processor 102b. For example, when the first processor 102a initiates the first set of transactions with the second processor 102b, the second processor 102b is configured to receive the first set of commands from the first processor 102a by way of the interconnect 106. When the first set of transactions correspond to read transactions, the second processor 102b is further configured to retrieve, from the first memory, the first set of read data associated with the first set of transactions, respectively, and transmit the first set of read data to the interconnect 106 for providing to the first processor 102a. Similarly, when the first set of transactions correspond to write transactions, the second processor 102b is further configured to receive the first set of write data associated with the first set of transactions from the interconnect 106, respectively, and write the first set of write data to the first memory.

When the first processor 102a initiates the first transaction with the second processor 102b, the second processor 102b is further configured to receive the first command CM1 from the interconnect 106. When the first transaction corresponds to a read transaction, the second processor 102b is further configured to retrieve, from the first memory based on the first command CM1, the first read data RD1 (i.e., the first and second read data portions R1P1 and R1P2), and transmit the first read data RD1 to the interconnect 106 for providing to the first processor 102a. The first and second read data portions R1P1 and R1P2 are retrieved and transmitted before and after the first fault is detected, respectively. Similarly, when the first transaction corresponds to a write transaction, the second processor 102b is further configured to receive the first write data WD1 (i.e., the first and second write data portions W1P1 and W1P2) from the interconnect 106, and write the received first write data WD1 to the first memory. The first and second write data portions W1P1 and W1P2 are received and written before and after the first fault is detected, respectively. It will be apparent to a person skilled in the art that as the execution of the second transaction is halted, the second processor 102b does not receive the second command CM2.

When the first processor 102a initiates the third transaction with the second processor 102b, the second processor 102b is further configured to receive the third command CM3 from the interconnect 106. For the sake of ongoing discussion, it is assumed that during execution of the third transaction and prior to the initiation of the fourth transaction, the second fault is detected in the second processor 102b. The second processor 102b may thus further be configured to generate a second fault signal FS2 indicative of the second fault detected in the second processor 102b. In an embodiment, an activated state (i.e., a logic high state) of the second fault signal FS2 indicates that the second fault is detected in the second processor 102b. In another embodiment, a deactivated state (i.e., a logic low state) of the second fault signal FS2 indicates that the second fault is detected in the second processor 102b.

As the second fault is detected during the execution of the third transaction, it is assumed that a portion of the third transaction is executed. For example, when the third transaction corresponds to a read transaction, the second processor 102b is further configured to retrieve the third read data portion R2P1 from the first memory, and transmit the retrieved third read data portion R2P1 to the interconnect 106, before the second fault is detected. Similarly, when the third transaction corresponds to a write transaction, the second processor 102b is further configured to receive the third write data portion W2P1 from the interconnect 106, and write the received third write data portion W2P1 to the first memory, before the second fault is detected. In such a scenario, upon the detection of the second fault, the second processor 102b is enabled to execute (i.e., complete) the third transaction, and the execution of the fourth transaction (i.e., the transaction that is initiated by the first processor 102a with the second processor 102b after the second fault is detected) is halted. It will be apparent to a person skilled in the art that as the execution of the fourth transaction is halted, the second processor 102b does not receive the fourth command CM4.

If the second processor 102b successfully executes the third transaction within the third predetermined time duration, the second processor 102b is further configured to receive a fourth control signal CS4 from the second fault recovery system 104b, and based on the fourth control signal CS4, the second processor 102b is disconnected from the interconnect 106. In an embodiment, when the fourth control signal CS4 is activated (i.e., is at a logic high state), the second processor 102b is disconnected from the interconnect 106. In another embodiment, when the fourth control signal CS4 is deactivated (i.e., is at a logic low state), the second processor 102b is disconnected from the interconnect 106.

If the second processor 102b fails to execute the third transaction within the third predetermined time duration, the interconnect 106 is queued. In such a scenario, the second processor 102b is further configured to receive the fourth control signal CS4 from the second fault recovery system 104b, and based on the fourth control signal CS4, the second processor 102b is disconnected from the interconnect 106. The execution of the third transaction is then attempted by the second fault recovery system 104b. If the second fault recovery system 104b is unable to execute the third transaction within the fourth predetermined time duration, the SoC 100 is reset. Conversely, if third transaction is successfully executed by the second fault recovery system 104b within the fourth predetermined time duration, the interconnect 106 is dequeued.

Upon the successful execution of the third transaction, by the second processor 102b or the second fault recovery system 104b, the second processor 102b is further configured to receive a second reset signal RST2. The second processor 102b is reset based on the received second reset signal RST2. In an embodiment, when the second reset signal RST2 is activated (i.e., is at a logic high state), the second processor 102b is reset. In another embodiment, when the second reset signal RST2 is deactivated (i.e., is at a logic low state), the second processor 102b is reset.

The second processor 102b is further configured to receive, upon the reset, second diagnostic data DD2 from the second fault recovery system 104b. The second diagnostic data DD2 includes a second identifier, a second memory address, and second handshake information associated with the third transaction. The second diagnostic data DD2 may further include additional information that indicates whether the third transaction is executed (i.e., completed) by the second processor 102b or the second fault recovery system 104b. Based on the second diagnostic data DD2, the second processor 102b is further configured to perform various post-recovery operations. For example, the second processor 102b may be configured to request the first processor 102a to reinitiate the third transaction if the third transaction is executed by the second fault recovery system 104b. It will be apparent to a person skilled in the art that various transactions initiated by the second processor 102b with at least one of the system memory 110 and the first processor 102a are executed in a similar manner as described above.

The first fault recovery system 104a is configured to monitor the communication between the first processor 102a and the interconnect 106 during a normal operation of the first processor 102a (i.e., during an absence of any fault in the first processor 102a). For example, the first fault recovery system 104a monitors the transfer of the first set of commands and the first set of write data from the first processor 102a to the interconnect 106, and the transfer of the first set of read data from the interconnect 106 to the first processor 102a. Similarly, the first fault recovery system 104a monitors the transfer of the first command CM1, the third and fourth commands CM3 and CM4, and the second write data WD2 from the first processor 102a to the interconnect 106, and the transfer of the second read data RD2 from the interconnect 106 to the first processor 102a.

When the first fault is detected in the first processor 102a (i.e., during the execution of the first transaction), the first fault recovery system 104a is further configured to receive the first fault signal FS1 from the first processor 102a. Alternatively, the first fault recovery system 104a may be configured to receive, from the system controller 112, a third fault signal FS3 that is indicative of the detected first fault. In an embodiment, an activated state (i.e., a logic high state) of the third fault signal FS3 indicates that the first fault is detected in the first processor 102a. In another embodiment, a deactivated state (i.e., a logic low state) of the third fault signal FS3 indicates that the first fault is detected in the first processor 102a.

Upon receiving at least one of the first and third fault signals FS1 and FS3, the first fault recovery system 104a is further configured to enable the first processor 102a to execute the first transaction. In other words, the first fault recovery system 104a is further configured to allow the first processor 102a to execute the first transaction. Further, the first fault recovery system 104a is configured to receive the second command CM2 associated with the second transaction from the first processor 102a, and halt the execution of the second transaction. The first fault recovery system 104a halts the execution of the second transaction by halting the transmission of the second command CM2 (i.e., by not transmitting the second command CM2 to the interconnect 106). Further, the first fault recovery system 104a is configured to generate and transmit the first control signal CS1 indicative of the halt in the execution of the second transaction to the first processor 102a.

If the first processor 102a successfully executes the first transaction within the first predetermined time duration, the first fault recovery system 104a is configured to generate and transmit a fifth control signal CS5 to the interconnect 106 to disconnect the interconnect 106 from the first processor 102a. In an embodiment, when the fifth control signal CS5 is activated (i.e., is at a logic high state), the interconnect 106 is disconnected from the first processor 102a. In another embodiment, when the fifth control signal CS5 is deactivated (i.e., is at a logic low state), the interconnect 106 is disconnected from the first processor 102a. The first fault recovery system 104a is further configured to generate and transmit, to the first processor 102a until the first processor 102a is reset, the first error response for each subsequent transaction initiated by the first processor 102a after the execution of the first transaction.

Although it is described that the first fault recovery system 104a generates and transmits the first error response to the first processor 102a for each subsequent transaction initiated by the first processor 102a after the execution of the first transaction, the scope of the present disclosure is not limited to it. In various other embodiments, until the first processor 102a is reset, the first fault recovery system 104a may halt execution of each subsequent transaction initiated by the first processor 102a, and generate and transmit a corresponding control signal (such as the first control signal CS1) to the first processor 102a, without deviating from the scope of the present disclosure.

The first fault recovery system 104a is further configured to generate and transmit, based on the execution of the first transaction, a first status signal SS1 to the system controller 112 to reset the first processor 102a. In an embodiment, an activated state (i.e., a logic high state) of the first status signal SS1 is indicative of the successful execution of the first transaction. In another embodiment, a deactivated state (i.e., a logic low state) of the first status signal SS1 is indicative of the successful execution of the first transaction. The first reset signal RST1 is generated based on the first status signal SS1. The first fault recovery system 104a is further configured to generate the first diagnostic data DD1 associated with the fault recovery of the first processor 102a, and transmit the first diagnostic data DD1 to the first processor 102a upon the reset of the first processor 102a.

If the first processor 102a is unable to execute the first transaction within the first predetermined time duration, the first fault recovery system 104a is further configured to generate and transmit the second control signal CS2 to the first processor 102a to disconnect the first processor 102a from the interconnect 106. Further, the failure of the first processor 102a to execute the first transaction results in queuing of the interconnect 106. In such a scenario, the first fault recovery system 104a attempts to execute (i.e., complete) the first transaction. In other words, the first fault recovery system 104a is further configured to perform at least one of first and second operations to execute (i.e., completing) the first transaction and dequeue the interconnect 106.

When the first transaction corresponds to a read transaction, the first fault recovery system 104a is further configured to perform the first operation to execute (i.e., completing) the first transaction and dequeue the interconnect 106. The first operation corresponds to a reception of the second read data portion R1P2 from the interconnect 106. The first read data portion R1P1 is received by the first processor 102a before the first fault is detected. In one embodiment, the first fault recovery system 104a may be configured to discard the second read data portion R1P2 received from the interconnect 106. When the first transaction corresponds to a write operation, the first fault recovery system 104a is further configured to perform the second operation to execute the first transaction and dequeue the interconnect 106. The second operation corresponds to generation and transmission of the second write data portion W1P2 to the interconnect 106 to write to at least one of the system memory 110 and the second processor 102b (i.e., the first memory). The first write data portion W1P1 is written to at least one of the system memory 110 and the second processor 102b before the first fault is detected.

The first fault recovery system 104a is further configured to generate and transmit, based on the execution of the first transaction, the first status signal SS1 to the system controller 112 to reset the first processor 102a. The first fault recovery system 104a is further configured to generate the first diagnostic data DD1 associated with the fault recovery of the first processor 102a, and transmit the first diagnostic data DD1 to the first processor 102a upon the reset of the first processor 102a. The first fault recovery system 104a thus manages the fault recovery of the first processor 102a. Conversely, if the first fault recovery system 104a is unable to successfully execute the first transaction within the second predetermined time duration, the first fault recovery system 104a is further configured to generate a second status signal SS2 to the system controller 112 to reset the SoC 100. In an embodiment, an activated state (i.e., a logic high state) of the second status signal SS2 is indicative of the unsuccessful execution of the first transaction. In another embodiment, a deactivated state (i.e., a logic low state) of the second status signal SS2 is indicative of the unsuccessful execution of the first transaction. Based on the second status signal SS2, the SoC 100 is reset. The structure and the working of the first fault recovery system 104a is explained in detail in FIG. 2.

The second fault recovery system 104b is configured to monitor the communication between the second processor 102b and the interconnect 106 during a normal operation of the second processor 102b (i.e., during an absence of any fault in the second processor 102b). For example, the second fault recovery system 104b monitors the transfer of the first set of commands and the first set of write data from the interconnect 106 to the second processor 102b, and the transfer of the first set of read data from the second processor 102b to the interconnect 106. Similarly, the second fault recovery system 104b monitors the transfer of the first and third commands CM1 and CM3 and the first write data WD1 from the interconnect 106 to the second processor 102b, and the transfer of the first read data. RD1 from the second processor 102b to the interconnect 106.

When the second fault is detected in the second processor 102b (i.e., during the execution of the third transaction), the second fault recovery system 104b is further configured to receive the second fault signal FS2 from the second processor 102b. Alternatively, the second fault recovery system 104b may be configured to receive a fourth fault signal FS4 indicative of the detected second fault from the system controller 112. In an embodiment, an activated state (i.e., a logic high state) of the fourth fault signal FS4 indicates that the second fault is detected in the second processor 102b. In another embodiment, a deactivated state (i.e., a logic low state) of the fourth fault signal FS4 indicates that the second fault is detected in the second processor 102b.

Upon receiving at least one of the second and fourth fault signals FS2 and FS4, the second fault recovery system 104b is further configured to enable the second processor 102b to execute the third transaction. In other words, the second fault recovery system 104b is further configured to allow the second processor 102b to execute the third transaction. Further, the second fault recovery system 104b is configured to receive the fourth command CM4 associated with the fourth transaction from the interconnect 106, and halt the execution of the fourth transaction. The second fault recovery system 104b halts the execution of the fourth transaction by halting the transmission of the fourth command CM4 (i.e., by not transmitting the fourth command CM4 to the second processor 102b). The second fault recovery system 104b is further configured to generate and transmit the third control signal CS3 indicative of the halt in the execution of the fourth transaction to the interconnect 106 for providing to the first processor 102a.

If the second processor 102b successfully executes the third transaction within the third predetermined time duration, the second fault recovery system 104b is further configured to generate and transmit the fourth control signal CS4 to the second processor 102b to disconnect the second processor 102b from the interconnect 106. Similarly, for each subsequent transaction initiated by the first processor 102a with the second processor 102b until the second processor 102b is reset, the second fault recovery system 104b is further configured to generate and transmit the corresponding second error response to the interconnect 106 for providing to the first processor 102a.

Although it is described that the first fault recovery system 104a generates and transmits the second error response to the interconnect 106 for each subsequent transaction initiated by the first processor 102a with the second processor 102b after the second fault is detected, the scope of the present disclosure is not limited to it. In various other embodiments, until the second processor 102b is reset, the second fault recovery system 104b may halt execution of each subsequent transaction initiated by the first processor 102a with the second processor 102b, and generate and transmit a corresponding control signal (such as the third control signal CS3) to the interconnect 106 for providing to the first processor 102a.

The second fault recovery system 104b is further configured to generate and transmit, based on the execution of the third transaction, a third status signal SS3 to the system controller 112 to reset the second processor 102b. In an embodiment, an activated state (i.e., a logic high state) of the third status signal SS3 is indicative of the successful execution of the third transaction. In another embodiment, a deactivated state (i.e., a logic low state) of the third status signal SS3 is indicative of the successful execution of the third transaction. The second reset signal RST2 is generated based on the third status signal SS3. The second fault recovery system 104b is further configured to generate the second diagnostic data DD2 associated with the fault recovery of the second processor 102b, and transmit the second diagnostic data DD2 to the second processor 102b upon the reset of the second processor 102b. Although it is described that the second diagnostic data DD2 is transmitted solely to the second processor 102b, the scope of the present disclosure is not limited to it. In various other embodiments, the second fault recovery system 104b may additionally transmit the second diagnostic data DD2 to the first processor 102a by way of the interconnect 106.

If the second processor 102b is unable to successfully execute the third transaction within the third predetermined time duration, the second fault recovery system 104b is further configured to generate and transmit the fourth control signal CS4 to the second processor 102b to disconnect the second processor 102b from the interconnect 106. Further, the failure in the execution of the third transaction results in queuing of the interconnect 106. In such a scenario, the second fault recovery system 104b attempts to execute (i.e., complete) the third transaction. In other words, the second fault recovery system 104b is further configured to perform at least one of third and fourth operations to execute (i.e., completing) the third transaction and dequeue the interconnect 106.

When the third transaction corresponds to a read transaction, the second fault recovery system 104b is further configured to perform the third operation to execute the third transaction and dequeue the interconnect 106. The third operation corresponds to generation and transmission of the fourth read data portion R2P2 to the interconnect 106 for providing to the first processor 102a. The third read data portion R2P1 is provided to the first processor 102a by the second processor 102b before the second fault is detected. When the third transaction corresponds to a write operation, the second fault recovery system 104b is further configured to perform the fourth operation to execute the third transaction and dequeue the interconnect 106. The fourth operation corresponds to a reception of the fourth write data portion W2P2 from the interconnect 106. In one embodiment, the second fault recovery system 104b may be configured to discard the fourth write data portion W2P2 received from the interconnect 106. The third write data portion W2P1 is received by the second processor 102b from the interconnect 106 before the second fault is detected.

The second fault recovery system 104b is further configured to generate and transmit, based on the execution of the third transaction, the third status signal SS3 to the system controller 112 to reset the second processor 102b. The second fault recovery system 104b is further configured to generate the second diagnostic data DD2 associated with the fault recovery of the second processor 102b, and transmit the second diagnostic data DD2 to the second processor 102b upon the reset of the second processor 102b. The second fault recovery system 104b thus manages the fault recovery of the second processor 102b. Conversely, if the second fault recovery system 104b is unable to successfully execute the third transaction within the fourth predetermined time duration, the second fault recovery system 104b is further configured to generate and transmit a fourth status signal SS4 to the system controller 112 to reset the SoC 100. In an embodiment, an activated state (i.e., a logic high state) of the fourth status signal SS4 is indicative of the unsuccessful execution of the third transaction. In another embodiment, a deactivated state (i.e., a logic low state) of the fourth status signal SS4 is indicative of the unsuccessful execution of the third transaction. The structure and the working of the second fault recovery system 104b is explained in detail in FIG. 3.

The interconnect 106 is configured to receive various commands generated by the first processor 102a for initiating various transactions with at least one of the system memory 110 and the second processor 102b. For example, when the first processor 102a initiates the first set of transactions, the interconnect 106 is further configured to receive the first set of commands from the first processor 102a, and transmit the first set of commands to at least one of the memory controller 108 and the second processor 102b. When the first set of transactions correspond to write transactions, the interconnect 106 is further configured to receive the first set of write data from the first processor 102a, and transmit the first set of write data to at least one of the memory controller 108 and the second processor 102b, respectively. Similarly, when the first set of transactions correspond to read transactions, the interconnect 106 is further configured to receive the first set of read data from at least one of the memory controller 108 and the second processor 102b, and transmit the first set of read data to the first processor 102a, respectively.

When the first processor 102a initiates the first, third, and fourth transactions, the interconnect 106 is further configured to receive the first, third, and fourth commands CM1, CM3, and CM4 from the first processor 102a, respectively. Further, the interconnect 106 is configured to transmit the first and third commands CM1 and CM3 to the second processor 102b, and the fourth command CM4 to the second fault recovery system 104b. When the interconnect 106 transmits the fourth command CM4 to the second fault recovery system 104b, the interconnect 106 is further configured to receive the third control signal CS3 indicative of the halt in the execution of the fourth transaction. In an embodiment, the interconnect 106 may be configured to transmit the third control signal CS3 to the first processor 102a. Similarly, the interconnect 106 may further be configured to receive the second error response from the second fault recovery system 104b, and transmit the second error response to the first processor 102a. Additionally, when the first processor 102a successfully executes the first transaction, after the first fault is detected in the first processor 102a, the interconnect 106 is further configured to receive the fifth control signal CS5 from the first fault recovery system 104a. Based on the fifth control signal CS5, the interconnect 106 is disconnected from the first processor 102a.

When the first and third transactions correspond to write transactions, the interconnect 106 is configured to receive the first write data portion W1P1 and the second write data WD2 (i.e., the third and fourth write data portions W2P1 and W2P2) from the first processor 102a, and the second write data portion W1P2 from the first fault recovery system 104a. The first and second write data portions W1P1 and W1P2 are received before and after the first fault is detected, respectively. Similarly, the third and fourth write data portions W2P1 and W2P2 are received before and after the second fault is detected, respectively. The interconnect 106 is further configured to transmit the first and second write data portions W1P1 and W1P2 (i.e., the first write data. WD1) to at least one of the memory controller 108 and the second processor 102b before and after the first fault is detected, respectively. Similarly, the interconnect 106 is further configured to transmit the third write data portion W2P1 to the second processor 102b and the fourth write data portion W2P2 to the second fault recovery system 104b before and after the second fault is detected, respectively.

When the first transaction corresponds to a read transaction, the interconnect 106 is configured to receive the first read data RD1 (i.e., the first and second read data portions R1P1 and R1P2) from at least one of the memory controller 108 and the second processor 102b. The first and second read data portions R1P1 and R1P2 are received before and after the first fault is detected, respectively. The interconnect 106 is further configured to transmit the first and second read data portions R1P1 and R1P2 to the first processor 102a and the first fault recovery system 104a, respectively. The first and second read data portions R1P1 and R1P2 are transmitted before and after the first fault is detected, respectively.

When the third transaction corresponds to a read transaction, the interconnect 106 is further configured to receive the third and fourth read data portions R2P1 and R2P2 from the second processor 102b and the second fault recovery system 104b, respectively. The third and fourth read data portions R2P1 and R2P2 are received before and after the second fault is detected, respectively. The interconnect 106 is further configured to transmit the third and fourth read data portions R2P1 and R2P2 to the first processor 102a before and after the second fault is detected, respectively.

The memory controller 108 is configured to control memory access operations (i.e., read and write operations) associated with the system memory 110. The memory controller 108 is further configured to receive various commands generated by the first processor 102a for initiating various transactions with the system memory 110. For example, when the first processor 102a initiates the first set of transactions with the system memory 110, the memory controller 108 is further configured to receive the first set of commands from the first processor 102a by way of the interconnect 106. When the first set of transactions correspond to read transactions, the memory controller 108 is further configured to retrieve, from the system memory 110, the first set of read data associated with the first set of transactions, respectively, and transmit the first set of read data to the interconnect 106 for providing to the first processor 102a. Similarly, when the first set of transactions correspond to write transactions, the memory controller 108 is further configured to receive the first set of write data associated with the first set of transactions from the interconnect 106, respectively, and write the first set of write data to the system memory 110.

When the first processor 102a initiates the first transaction with the system memory 110, the memory controller 108 is further configured to receive the first command CM1 from the interconnect 106. When the first transaction corresponds to a read transaction, the memory controller 108 is further configured to retrieve, from the system memory 110 based on the first command CM1, the first read data RD1 (i.e., the first and second read data portions R1P1 and R1P2) and transmit the first read data RD1 to the interconnect 106 for providing to the first processor 102a. The first and second read data portions R1P1 and R1P2 are transmitted to the interconnect 106 before and after the first fault is detected, respectively. Similarly, when the first transaction corresponds to a write transaction, the memory controller 108 is further configured to receive the first write data WD1 (i.e., the first and second write data portions W1P1 and W1P2) from the interconnect 106. The first and second write data portions W1P1 and W1P2 are received before and after the first fault is detected, respectively. The memory controller 108 is further configured to write the first write data WD1 to the system memory 110.

The system memory 110 is configured to receive and store the first write data WD1 from the memory controller 108. The system memory 110 is further configured to provide stored data as the first read data RD1 to the memory controller 108. In an example, the system memory 110 is a random-access memory.

The system controller 112 is configured to generate the third and fourth fault signals FS3 and FS4 when the first and second faults are detected in the first and second processors 102a and 102b, respectively. In one embodiment, the system controller 112 may be configured to detect the first and second faults by monitoring the first and second processors 102a and 102b, respectively. Further, the system controller 112 is configured to transmit the third and fourth fault signals FS3 and FS4 to the first and second fault recovery systems 104a and 104b, respectively.

The system controller 112 is further configured to receive the first and third status signals SS1 and SS3 from the first and second fault recovery systems 104a and 104b, respectively. The system controller 112 receives the first and third status signals SS1 and SS3 when the first and third transactions are successfully executed, respectively. In such a scenario, the system controller 112 is further configured to generate and transmit the first and second reset signals RST1 and RST2 to the first and second processors 102a and 102b to reset the first and second processors 102a and 102b, respectively. Similarly, the system controller 112 is further configured to receive the second and fourth status signals SS2 and SS4 from the first and second fault recovery systems 104a and 104b, respectively. The system controller 112 receives the second and fourth status signals SS2 and SS4 when the first and second fault recovery systems 104a and 104b are unable to execute the first and third transactions within the second and fourth predetermined time durations, respectively. In such a scenario, the system controller 112 is further configured to reset the SoC 100.

It will be apparent to a person skilled in the art that that the scope of the present disclosure is not limited to the SoC 100 including two processors (such as the first and second processors 102a and 102b). In various other embodiments, the SoC 100 may include more than two processors, without deviating from the scope of the present disclosure. In such a scenario, the functionality of each processor is similar to the functionalities of the first and second processors 102a and 102b described above. Further, the SoC 100 includes a fault recovery system (such as the first and second fault recovery systems 104a and 104b) coupled with each processor such that the functionality of each fault recovery system is similar to the functionalities of the first and second fault recovery systems 104a and 104b described above.

Although FIG. 1 describes that the first and second fault recovery systems 104a and 104b execute the corresponding ongoing transactions (such as the first and third transactions, respectively) exclusively after the first and second processors 102a and 102b fail to execute the corresponding ongoing transactions, the scope of the present disclosure is not limited to it. In various other embodiments, the first and second fault recovery systems 104a and 104b may execute the corresponding ongoing transactions directly upon receiving the corresponding fault signals (such as the first and second fault signals FS1 and FS2, respectively), without deviating from the scope of the present disclosure.

Figure 2:
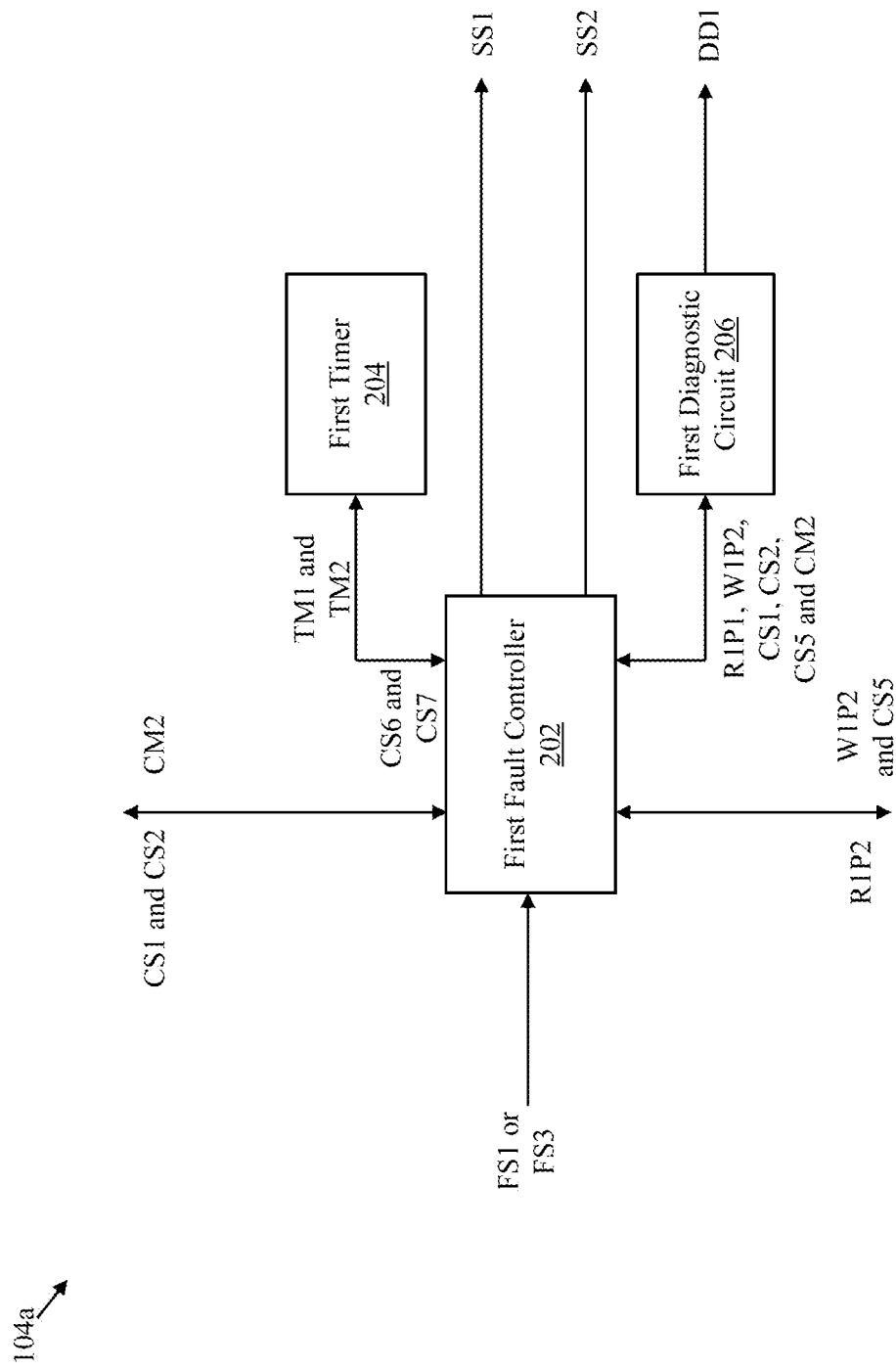
FIG. 2 illustrates a schematic block diagram of a first fault recovery system of the SoC of FIG. 1 in accordance with an embodiment of the present disclosure.

FIG. 2 illustrates a schematic block diagram of the first fault recovery system 104a in accordance with an embodiment of the present disclosure. The first fault recovery system 104a includes a first fault controller 202, a first timer 204 coupled with the first fault controller 202, and a first diagnostic circuit 206 coupled with the first fault controller 202.

The first fault controller 202 is coupled between the first processor 102a and the interconnect 106. During the normal operation of the first processor 102a, the first fault controller 202 is configured to monitor the communication between the first processor 102a and the interconnect 106. When the first fault is detected in the first processor 102a (i.e., during the execution of the first transaction), the first fault controller 202 is further configured to receive at least one of the first and third fault signals FS1 and FS3 from at least one of the first processor 102a and the system controller 112, respectively. The first and third fault signals FS1 and FS3 are indicative of the first fault detected in the first processor 102a. Upon receiving at least one of the first and third fault signals FS1 and FS3, the first fault controller 202 is further configured to enable the first processor 102a to execute (i.e., complete) the first transaction. In other words, the first fault controller 202 allows the first processor 102a to execute the first transaction.

The first fault controller 202 is further configured to generate and transmit, after the first fault is detected, a sixth control signal CS6 to the first timer 204 to activate the first timer 204. In an embodiment, when the sixth control signal CS6 is activated (i.e., is at a logic high state), the first timer 204 is activated. In another embodiment, when the sixth control signal CS6 is deactivated (i.e., is at a logic low state), the first timer 204 is activated. Further, the first fault controller 202 is configured to receive, from the first processor 102a, the second command CM2 associated with the second transaction, halt the execution of the second transaction, and generate and transmit the first control signal CS1 indicative of the halt in the execution of the second transaction to the first processor 102a.

If the first processor 102a successfully executes the first transaction before the first timer 204 times out (i.e., within the first predetermined time duration), the first fault controller 202 is further configured to generate and transmit the fifth control signal CS5 to the interconnect 106 to disconnect the interconnect 106 from the first processor 102a. In such a scenario, the first timer 204 may be reset. The first fault controller 202 is further configured to generate and transmit, until the first processor 102a is reset, the first error response to the first processor 102a for each subsequent transaction initiated by the first processor 102a after the execution of the first transaction. The first fault controller 202 is further configured to generate and transmit the first status signal SS1 to the system controller 112 to reset the first processor 102a.

If the first processor 102a is unable to execute the first transaction before the first timer 204 times out, the first fault controller 202 is further configured to receive a first time-out signal TM1 from the first timer 204. The first time-out signal TM1 is indicative of the failure of the first processor 102a to execute the first transaction after the first fault is detected in the first processor 102a. In an embodiment, an activated state (i.e., a logic high state) of the first time-out signal TM1 is indicative of the failure of the first processor 102a to execute the first transaction after the first fault is detected in the first processor 102a. In another embodiment, a deactivated state (i.e., a logic low state) of the first time-out signal TM1 is indicative of the failure of the first processor 102a to execute the first transaction after the first fault is detected in the first processor 102a. The failure in the execution of the first transaction results in queuing of the interconnect 106.

Upon receiving the first time-out signal TM1, the first fault controller 202 is further configured to generate and transmit a seventh control signal CS7 to the first timer 204 to activate the first tinier 204. In an embodiment, when the seventh control signal CS7 is activated (i.e., is at a logic high state), the first timer 204 is activated. In another embodiment, when the seventh control signal CS7 is deactivated (i.e., is at a logic low state), the first tinier 204 is activated.

The first fault controller 202 is further configured to generate and transmit, based on the first time-out signal TM1, the second control signal CS2 to the first processor 102a to disconnect the first processor 102a from the interconnect 106. Further, based on the first time-out signal TM1, the first fault controller 202 is configured to perform at least one of the first and second operations to execute the first transaction and dequeue the interconnect 106. When the first transaction corresponds to a read transaction, the first fault controller 202 performs the first operation to execute the first transaction and dequeue the interconnect 106. The first operation corresponds to a reception of the second read data portion R1P2 from the interconnect 106. The first read data portion R1P1 is received by the first processor 102a before the first fault is detected. Similarly, when the first transaction corresponds to a write transaction, the first fault controller 202 performs the second operation to execute the first transaction and dequeue the interconnect 106. The second operation corresponds to generation and transmission of the second write data portion W1P2 to the interconnect 106 to write to at least one of the system memory 110 and the second processor 102b (i.e., the first memory). The first write data portion W1P1 is written to at least one of the system memory 110 and the second processor 102b before the first fault is detected.

If the first fault controller 202 successfully executes the first transaction before the first timer 204 times out (i.e., within the second predetermined time duration), the first fault controller 202 is further configured to generate and transmit the first status signal SS1 to the system controller 112 to reset the first processor 102a. In such a scenario, the first timer 204 may be reset. Conversely, if the first fault controller 202 is unable to execute the first transaction before the first timer 204 times out, the first fault controller 202 is further configured to receive a second time-out signal TM2 from the first timer 204. The second time-out signal TM2 is indicative of the failure of the first fault controller 202 to execute the first transaction after the first processor 102a has failed to execute the first transaction. In an embodiment, an activated state (i.e., a logic high state) of the second time-out signal TM2 is indicative of the failure of the first fault controller 202 to execute the first transaction after the first processor 102a has failed to execute the first transaction. In another embodiment, a deactivated state (i.e., a logic low state) of the second time-out signal TM2 is indicative of the failure of the first fault controller 202 to execute the first transaction after the first processor 102a has failed to execute the first transaction. Upon receiving the second time-out signal TM2, the first fault controller 202 is further configured to generate and transmit the second status signal SS2 to the system controller 112 to reset the SoC 100.

The first timer 204 is configured to generate a first timer count (not shown). The first timer count is periodically decremented after a fifth predetermined time duration (not shown). The first timer 204 is further configured to receive, after the first fault is detected (i.e., after at least one of the first and third fault signals FS1 and FS3 are received), the sixth control signal CS6 from the first fault controller 202. Upon receiving the sixth control signal CS6, the first timer 204 is activated (i.e., the first timer count is generated at a first predetermined value (not shown) and is periodically decremented after the fifth predetermined time duration). When the first timer count is equal to a first threshold value (not shown) (i.e., when the first timer 204 times out), the first timer 204 is further configured to generate and transmit the first time-out signal TM1 to the first fault controller 202. The time taken by the first timer count to update from the first predetermined value to the first threshold value is equal to the first predetermined time duration. In such a scenario, the equality of the first timer count and the first threshold value is indicative of the failure of the first processor 102a to execute the first transaction within the first predetermined time duration.

The first timer 204 is similarly configured to receive, after the failure of the first processor 102a to execute the first transaction, the seventh control signal CS7 from the first fault controller 202. Upon receiving the seventh control signal CS7, the first timer 204 is activated (i.e., the first timer count is generated at a second predetermined value (not shown) and is periodically decremented after the fifth predetermined time duration). When the first timer count is equal to the first threshold value, the first timer 204 is further configured to generate and transmit the second time-out signal TM2 to the first fault controller 202. The time taken by the first timer count to update from the second predetermined value to the first threshold value is equal to the second predetermined time duration. In such a scenario, the equality of the first timer count and the first threshold value is indicative of the failure of the first fault controller 202 to execute the first transaction within the second predetermined time duration. In an embodiment, the first and second predetermined values are equal. In another embodiment, the first and second predetermined values are unequal.

The first diagnostic circuit 206 is configured to monitor the operations of the first fault controller 202. For example, the first diagnostic circuit 206 is further configured to receive the second read data portion R1P2, the second write data portion W1P2, the first and second control signals CS1 and CS2, the fifth control signal CS5, and the second command CM2 from the first fault controller 202. The first diagnostic circuit 206 is further configured to generate the first diagnostic data DD1 associated with the fault recovery of the first processor 102a that is managed by the first fault controller 202. The generation of the first diagnostic data DD1 is initiated when the first fault is detected. The first diagnostic circuit 206 is further coupled with the first processor 102a, and configured to transmit the first diagnostic data DD1 to the first processor 102a upon the reset of the first processor 102a.

Figure 3:
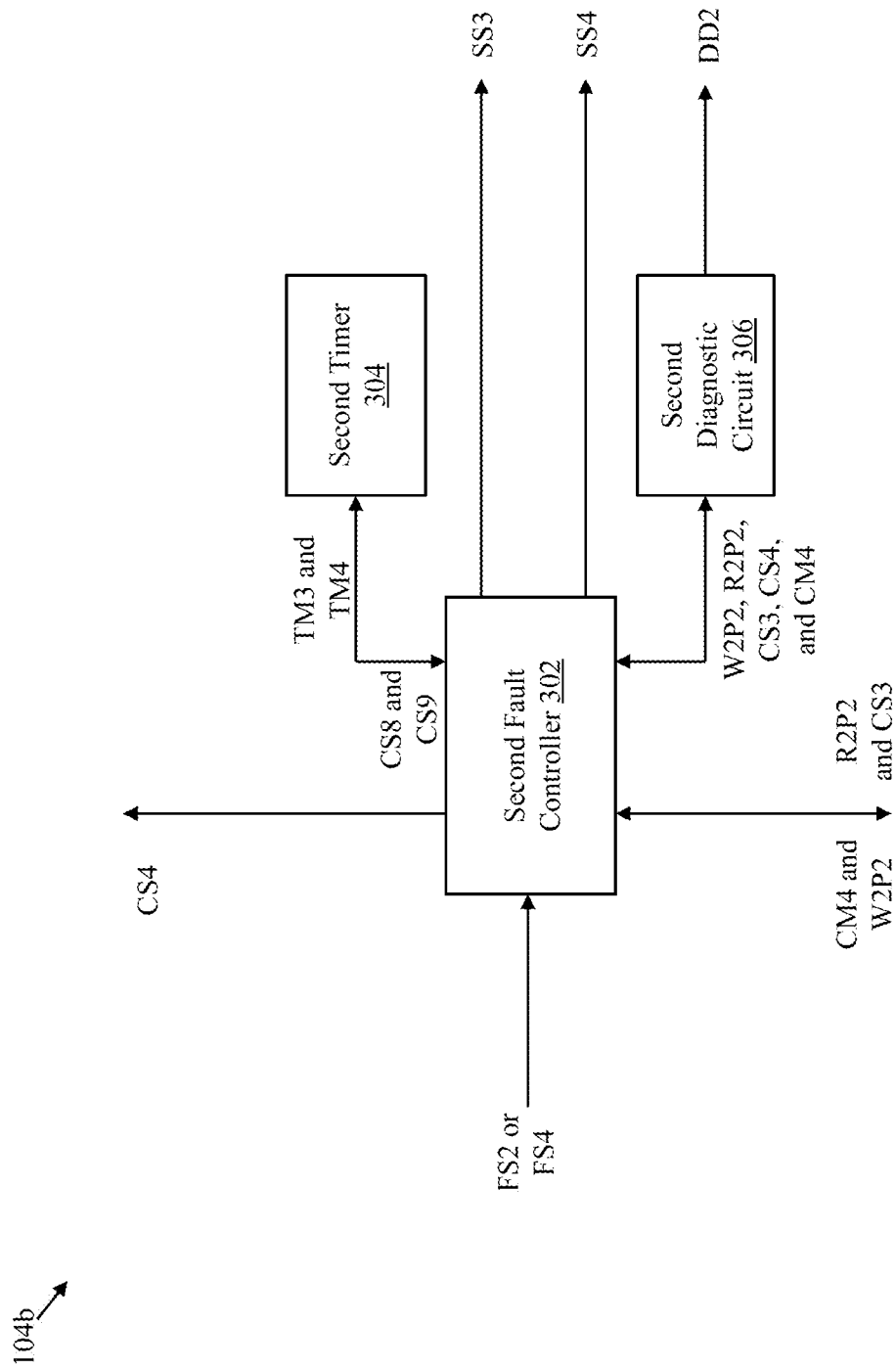
FIG. 3 illustrates a schematic block diagram of a second fault recovery system of the SoC of FIG. 1 in accordance with an embodiment of the present disclosure.

FIG. 3 illustrates a schematic block diagram of the second fault recovery system 104b in accordance with an embodiment of the present disclosure. The second fault recovery system 104b includes a second fault controller 302, a second timer 304 coupled with the second fault controller 302, and a second diagnostic circuit 306 coupled with the second fault controller 302.

The second fault controller 302 is coupled between the second processor 102b and the interconnect 106. During the normal operation of the second processor 102b, the second fault controller 302 is configured to monitor the communication between the second processor 102b and the interconnect 106. When the second fault is detected in the second processor 102b (i.e., during the execution of the third transaction), the second fault controller 302 is further configured to receive at least one of the second and fourth fault signals FS2 and FS4 from at least one of the second processor 102b and the system controller 112, respectively. The second and fourth fault signals FS2 and FS4 are indicative of the second fault detected in the second processor 102b. Upon receiving at least one of the second and fourth fault signals FS2 and FS4, the second fault controller 302 is further configured to enable the second processor 102b to execute (i.e., complete) the third transaction. In other words, the second fault controller 302 allows the second processor 102b to execute the third transaction.

The second fault controller 302 is further configured to generate and transmit, after the second fault is detected, an eighth control signal CS8 to the second timer 304 to activate the second timer 304. In an embodiment, when the eighth control signal CS8 is activated (i.e., is at a logic high state), the second timer 304 is activated. In another embodiment, when the eighth control signal CS8 is deactivated (i.e., is at a logic low state), the second timer 304 is activated. Further, the second fault controller 302 is configured to receive, from the interconnect 106, the fourth command CM4 associated with the fourth transaction, halt the execution of the fourth transaction, and generate and transmit the third control signal CS3 indicative of the halt in the execution of the fourth transaction to the interconnect 106.

If the second processor 102b successfully executes the third transaction before the second timer 304 times out (i.e., within the third predetermined time duration), the second fault controller 302 is further configured to generate and transmit the fourth control signal CS4 to the second processor 102b to disconnect the second processor 102b from the interconnect 106. In such a scenario, the second timer 304 may be reset. The second fault controller 302 is further configured to generate and transmit, until the second processor 102b is reset, the second error response to the interconnect 106 for each subsequent transaction initiated by the first processor 102a with the second processor 102b after the execution of the third transaction. In other words, the second fault controller 302 generates and transmits the second error response in response to a command associated with each subsequent transaction received from the interconnect 106. Further, the second fault controller 302 is configured to generate and transmit the second status signal SS2 to the system controller 112 to reset the second processor 102b.

If the second processor 102b is unable to execute the third transaction before the second timer 304 times out, the second fault controller 302 is further configured to receive a third time-out signal TM3 from the second timer 304. The third time-out signal TM3 is indicative of the failure of the second processor 102b to execute the third transaction after the second fault is detected in the second processor 102b. In an embodiment, an activated state (i.e., a logic high state) of the third time-out signal TM3 is indicative of the failure of the second processor 102b to execute the third transaction after the second fault is detected in the second processor 102b. In another embodiment, a deactivated state (i.e., a logic low state) of the third time-out signal TM3 is indicative of the failure of the second processor 102b to execute the third transaction after the second fault is detected in the second processor 102b. The failure in the execution of the third transaction results in queuing of the interconnect 106.

Upon receiving the third time-out signal TM3, the second fault controller 302 is further configured to generate and transmit a ninth control signal CS9 to the second timer 304 to activate the second timer 304. In an embodiment, when the ninth control signal CS9 is activated (i.e., is at a logic high state), the second timer 304 is activated. In another embodiment, when the ninth control signal CS9 is deactivated (i.e., is at a logic low state), the second timer 304 is activated.

The second fault controller 302 is further configured to generate and transmit, based on the third time-out signal TM3, the fourth control signal CS4 to the second processor 102b to disconnect the second processor 102b from the interconnect 106. Further, based on the third time-out signal TM3, the second fault controller 302 is configured to perform at least one of the third and fourth operations to execute the third transaction and dequeue the interconnect 106.

When the third transaction corresponds to a read transaction, the second fault controller 302 performs the third operation to execute the third transaction and dequeue the interconnect 106. The third operation corresponds to generation and transmission of the fourth read data portion R2P2 to the interconnect 106 for providing to the first processor 102a. The third read data portion R2P1 is provided to the first processor 102a before the second fault is detected. Similarly, when the third transaction corresponds to a write transaction, the second fault controller 302 performs the fourth operation to execute the third transaction and dequeue the interconnect 106. The fourth operation corresponds to the reception of the fourth write data portion W2P2 from the interconnect 106. The third write data portion W2P1 is received by the second processor 102b before the second fault is detected.

If the second fault controller 302 successfully executes the third transaction before the second timer 304 times out (i.e., within the fourth predetermined time duration), the second fault controller 302 is further configured to generate and transmit the third status signal SS3 to the system controller 112 to reset the second processor 102b. In such a scenario, the second timer 304 may be reset. Conversely, if the second fault controller 302 is unable to execute the third transaction before the second timer 304 times out, the second fault controller 302 is further configured to receive a fourth time-out signal TM4 from the second timer 304. The fourth time-out signal TM4 is indicative of the failure of the second fault controller 302 to execute the third transaction after the second processor 102b has failed to execute the third transaction. In an embodiment, an activated state (i.e., a logic high state) of the fourth time-out signal TM4 is indicative of the failure of the second fault controller 302 to execute the third transaction after the second processor 102b has failed to execute the third transaction. In another embodiment, a deactivated state (i.e., a logic low state) of the fourth time-out signal TM4 is indicative of the failure of the second fault controller 302 to execute the third transaction after the second processor 102b has failed to execute the third transaction. Upon receiving the fourth time-out signal TM4, the second fault controller 302 is further configured to generate and transmit the fourth status signal SS4 to the system controller 112 to reset the SoC 100.

The second timer 304 is configured to generate a second timer count (not shown). The second timer count is periodically decremented after a sixth predetermined time duration (not shown). The second timer 304 is further configured to receive, after the second fault is detected (i.e., after at least one of the second and fourth fault signals FS2 and FS4 are received), the eighth control signal CS8 from the second fault controller 302. Upon receiving the eighth control signal CS8, the second timer 304 is activated (i.e., the second timer count is generated at a third predetermined value (not shown) and is periodically decremented after the sixth predetermined time duration). When the second timer count is equal to a second threshold value (i.e., when the second timer 304 times out), the second timer 304 is further configured to generate the third time-out signal TM3. The time taken by the second timer count to update from the third predetermined value to the second threshold value is equal to the third predetermined time duration. In such a scenario, the equality of the second timer count and the second threshold value is indicative of the failure of the second processor 102b to execute the third transaction within the third predetermined time duration.

The second timer 304 is similarly configured to receive, after the failure of the second processor 102b to execute the third transaction, the ninth control signal CS9 from the second fault controller 302. Upon receiving the ninth control signal CS9, the second timer 304 is activated (i.e., the second tinier count is generated at a fourth predetermined value (not shown) and is periodically decremented after the sixth predetermined time duration). When the second timer count is equal to the second threshold value, the second timer 304 is further configured to generate the fourth time-out signal TM4. The time taken by the second timer count to update from the fourth predetermined value to the second threshold value is equal to the fourth predetermined time duration. In such a scenario, the equality of the second timer count and the second threshold value is indicative of the failure of the second fault controller 302 to execute the third transaction within the fourth predetermined time duration. In an embodiment, the third and fourth predetermined values are equal. In another embodiment, the third and fourth predetermined values are unequal.

The second diagnostic circuit 306 is configured to monitor the operations of the second fault controller 302. For example, the second diagnostic circuit 306 is further configured to receive the fourth read data portion R2P2, the fourth write data portion W2P2, the third and fourth control signals CS3 and CS4, and the fourth command CM4. The second diagnostic circuit 306 is further configured to generate the second diagnostic data DD2 associated with the fault recovery of the second processor 102b that is managed by the second fault controller 302. The generation of the second diagnostic data DD2 is initiated when the second fault is detected. The second diagnostic circuit 306 is further coupled with the second processor 102b, and configured to transmit the second diagnostic data DD2 to the second processor 102b upon the reset of the second processor 102b.

Figure 4A:
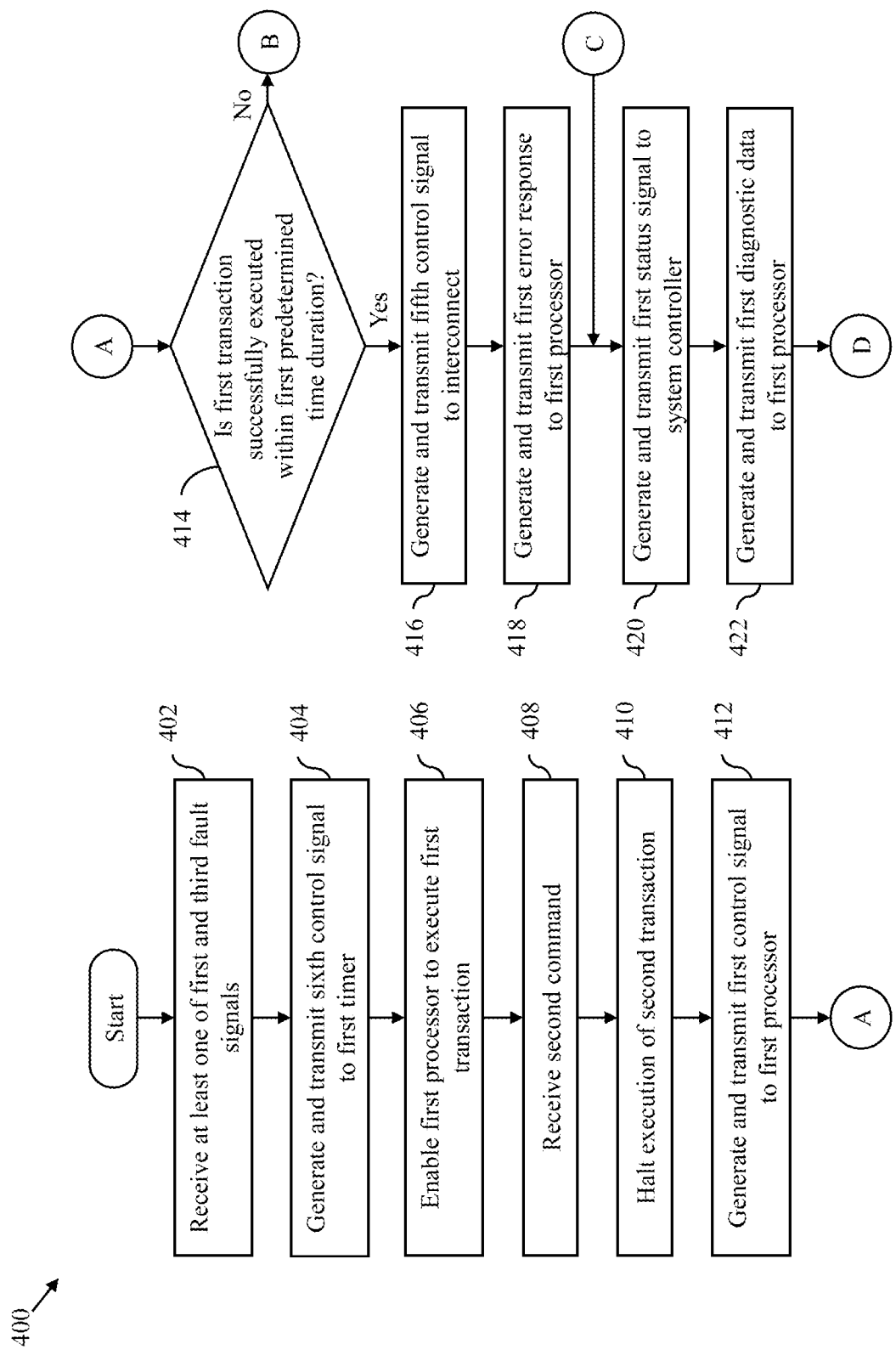
FIGS. 4A and 4B, collectively, represent a flowchart that illustrates a first fault recovery method for managing a fault recovery of a first processor of the SoC of FIG. 1 by the first fault recovery system in accordance with an embodiment of the present disclosure.
Figure 4B:
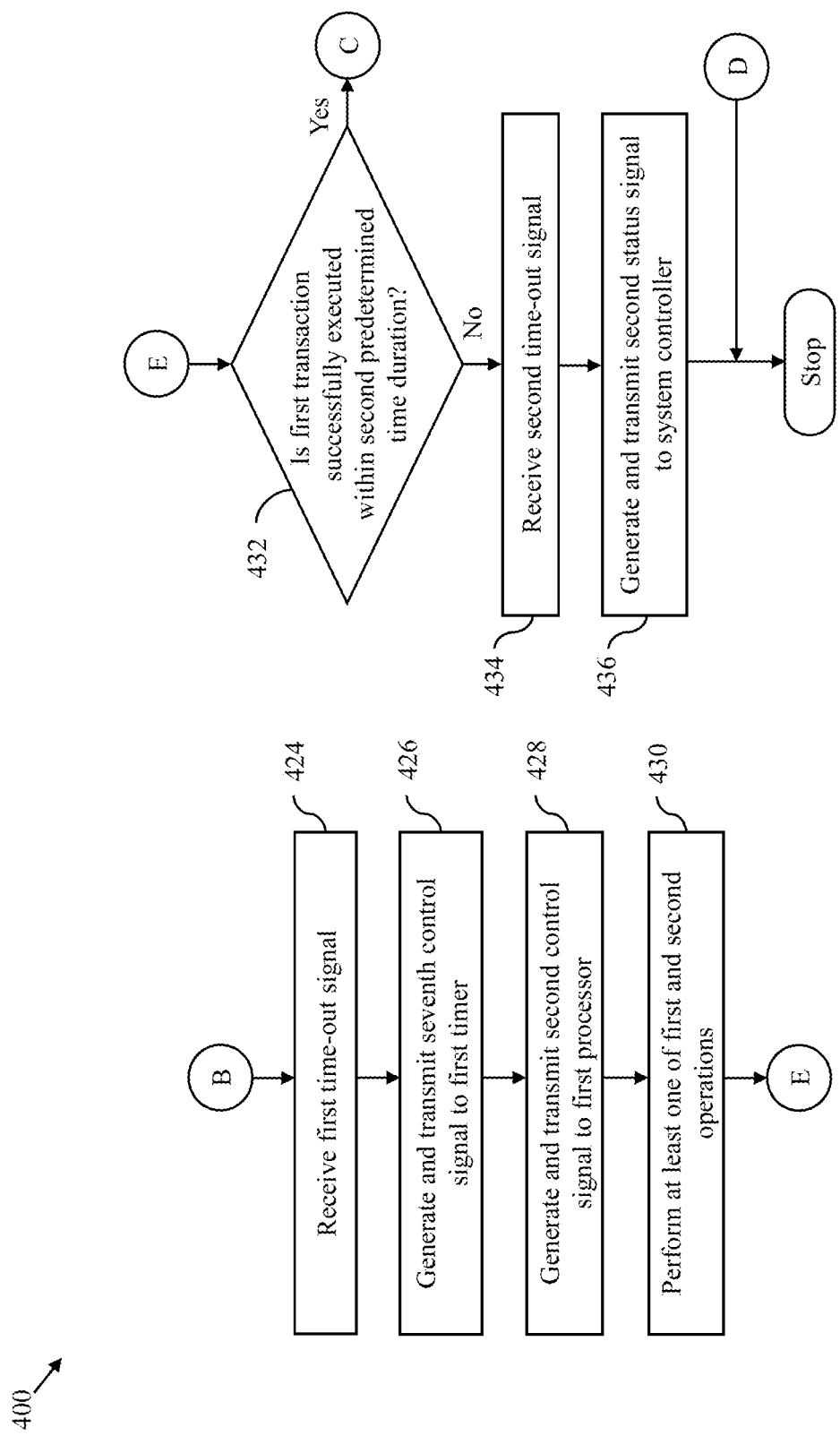

FIGS. 4A and 4B, collectively, represent a flowchart 400 that illustrates a first fault recovery method for managing the fault recovery of the first processor 102a by the first fault recovery system 104a in accordance with an embodiment of the present disclosure. The first processor 102a initiates various transactions with at least one of the system memory 110 and the second processor 102b. For example, the first processor 102a initiates the first and second transactions with at least one of the system memory 110 and the second processor 102b by generating first and second commands CM1 and CM2, respectively. The second transaction is initiated after the initiation of the first transaction. The first processor 102a transmits the first command CM1 to the interconnect 106 for providing to at least one of the memory controller 108 and the second processor 102b. For the sake of ongoing discussion, it is assumed that the first fault is detected in the first processor 102a during the execution of the first transaction and prior to the initiation of the second transaction.

Referring now to FIG. 4A, at step 402, the first fault controller 202 of the first fault recovery system 104a receives at least one of the first and third fault signals FS1 and FS3 indicative of the detected first fault from at least one of the first processor 102a and the system controller 112, respectively. As the first fault is detected during the execution of the first transaction, it is assumed that a portion of the first transaction is executed. For example, when the first transaction corresponds to a read transaction, the first processor 102a receives, from the interconnect 106 before the first fault is detected, the first read data portion R1P1 associated with the first transaction. The first read data portion R1P1 may be stored in at least one of the system memory 110 and the first memory, and may be retrieved and transmitted to the interconnect 106 by at least one of the memory controller 108 and the second processor 102b, respectively. Similarly, when the first transaction corresponds to a write transaction, before the first fault is detected, the first processor 102a generates and transmits the first write data portion W1P1 to the interconnect 106 to write to at least one of the system memory 110 and the second processor 102b.

At step 404, the first fault controller 202 generates and transmits the sixth control signal CS6 to the first timer 204 to activate the first timer 204. At step 406, the first fault controller 202 enables the first processor 102a to execute (i.e., complete) the first transaction. Further, at step 408, the first fault controller 202 receives, from the first processor 102a, the second command CM2 associated with the second transaction. At step 410, the first fault controller 202 halts the execution of the second transaction. At step 412, the first fault controller 202 generates and transmits, to the first processor 102a, the first control signal CS1 indicative of the halt in the execution of the second transaction. The first fault controller 202 executes steps 406, 408, 410, and 412 prior to the reception of the first time-out signal TM1 and after at least one of the first and third fault signals FF1 and FS3 are received.

At step 414, the first fault controller 202 determines whether the first transaction is successfully executed by the first processor 102a within the first predetermined time duration. If at step 414, it is determined that the first transaction is successfully executed by the first processor 102a within the first predetermined time duration, step 416 is performed. At step 416, the first fault controller 202 generates and transmits the fifth control signal CS5 to the interconnect 106 to disconnect the interconnect 106 from the first processor 102a. At step 418, the first fault controller 202 generates and transmits, until the first processor 102a is reset, the first error response to the first processor 102a for each subsequent transaction initiated by the first processor 102a after the execution of the first transaction.

At step 420, the first fault controller 202 generates and transmits the first status signal SS1 to the system controller 112 to reset the first processor 102a. Based on the first status signal SS1, the system controller 112 generates and transmits the first reset signal RST1 to the first processor 102a. The first processor 102a is reset based on the first reset signal RST1. At step 422, the first diagnostic circuit 206 of the first fault recovery system 104a generates the first diagnostic data DD1 associated with the fault recovery of the first processor 102a, and transmits the first diagnostic data DD1 to the first processor 102a upon the reset of the first processor 102a. Based on the first diagnostic data DD1, the first processor 102a may execute various post-recovery operations.

Referring now to FIG. 4B, if at step 414, it is determined that the first transaction is not executed by the first processor 102a within the first predetermined time duration, step 424 is performed. At step 424, the first fault controller 202 receives the first time-out signal TM1 from the first timer 204. The first time-out signal TM1 is indicative of the failure of the first processor 102a to execute the first transaction after the first fault is detected in the first processor 102a, and is generated when the first timer count is equal to the first threshold value. At step 426, the first fault controller 202 generates and transmits the seventh control signal CS7 to the first timer 204 to activate the first timer 204. At step 428, the first fault controller 202 generates and transmits, based on the first time-out signal TM1, the second control signal CS2 to the first processor 102a to disconnect the first processor 102a from the interconnect 106. At step 430, the first fault controller 202 performs, based on the first time-out signal TM1, at least one of the first and second operations to execute the first transaction and dequeue the interconnect 106.

When the first transaction corresponds to a read transaction, the first fault controller 202 performs the first operation to execute the first transaction and dequeue the interconnect 106. The first operation corresponds to a reception of the second read data portion R1P2 from the interconnect 106. Similarly, when the first transaction corresponds to a write transaction, the first fault controller 202 performs the second operation to execute the first transaction and dequeue the interconnect 106. The second operation corresponds to generation and transmission of the second write data portion W1P2 to the interconnect 106 to write to at least one of the system memory 110 and the second processor 102b (i.e., the first memory).

At step 432, the first fault controller 202 determines whether the first transaction is successfully executed within the second predetermined time duration. If at step 432, it is determined that the first transaction is successfully executed within the second predetermined time duration, steps 420 and 422 are performed. If at step 432, it is determined that the first transaction is not executed within the second predetermined time duration, step 434 is performed.

At step 434, the first fault controller 202 receives the second time-out signal TM2 from the first timer 204. The second time-out signal TM2 is indicative of the failure of the first fault controller 202 to execute the first transaction after the first processor 102a has failed to execute the first transaction. At step 436, the first fault controller 202 generates and transmits the second status signal SS2 to the system controller 112 to reset the SoC 100.

Figure 5A:
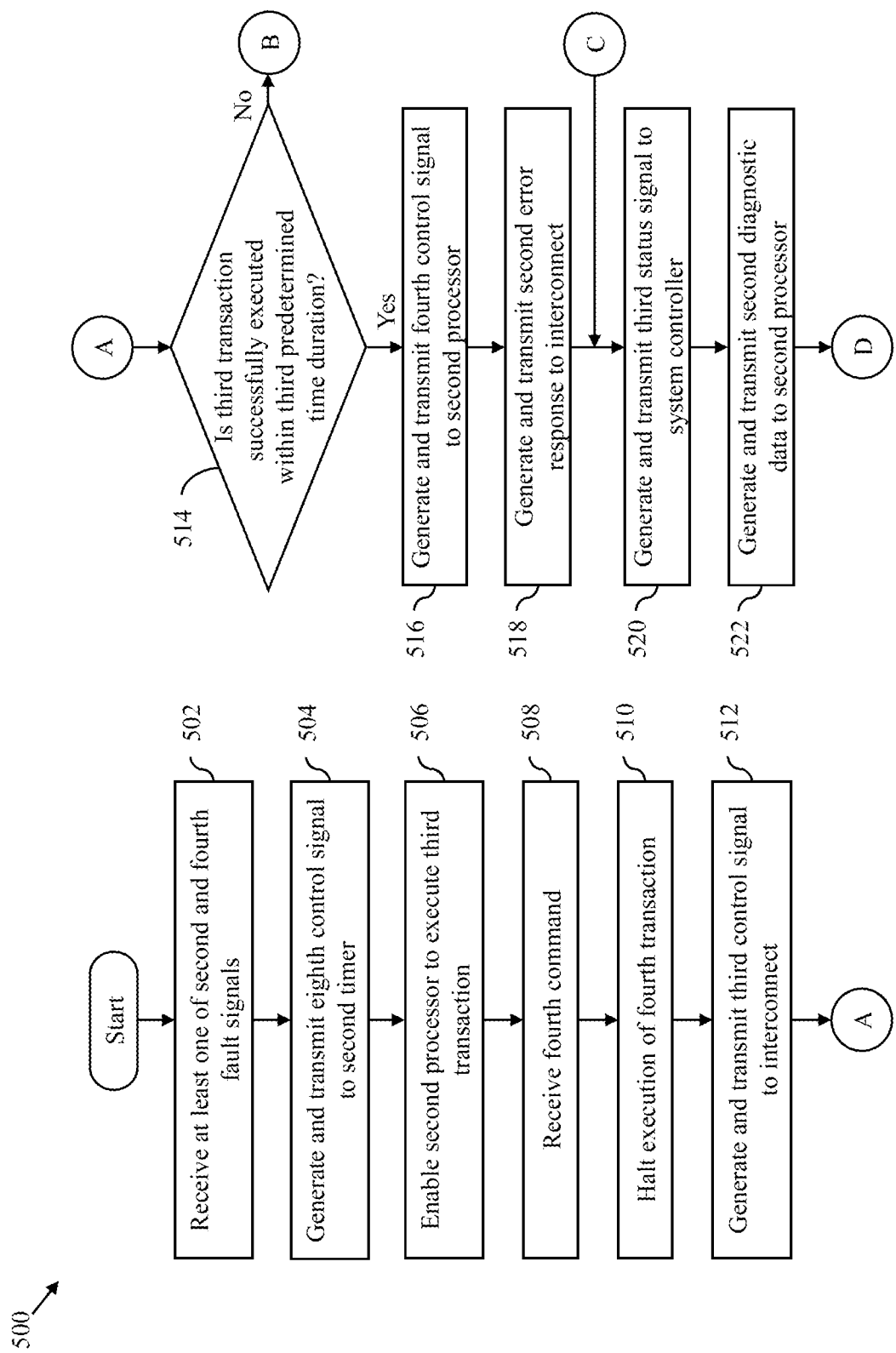
FIGS. 5A and 5B, collectively, represent a flowchart that illustrates a second fault recovery method for managing a fault recovery of a second processor of the SoC of FIG. 1 by the second fault recovery system in accordance with an embodiment of the present disclosure.
Figure 5B:
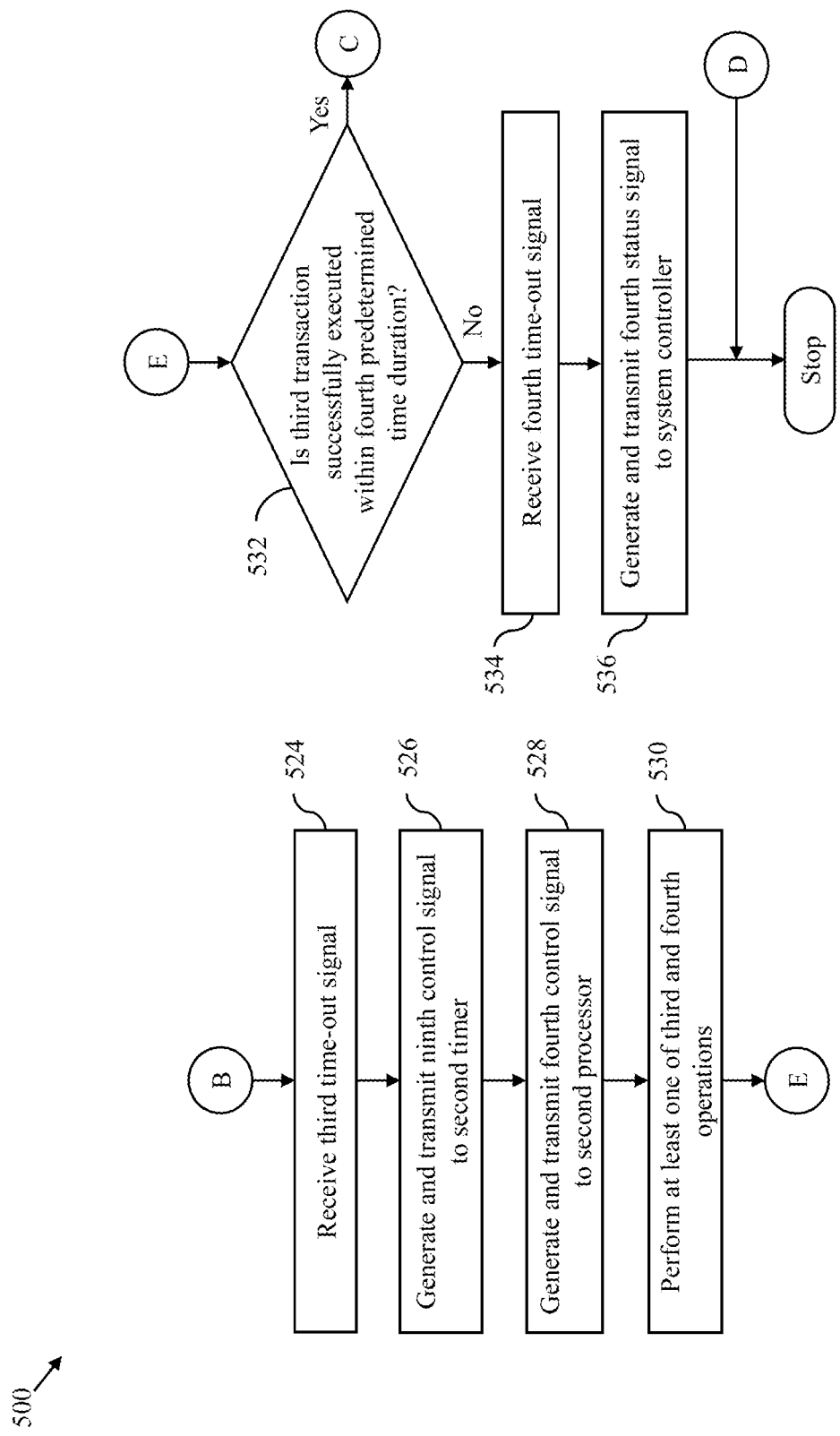

FIGS. 5A and 5B, collectively, represent a flowchart 500 that illustrates a second fault recovery method for managing the fault recovery of the second processor 102b by the second fault recovery system 104b in accordance with an embodiment of the present disclosure. The first processor 102a is configured to initiate various transactions with the second processor 102b. For example, the first processor 102a initiates the third and fourth transactions with the second processor 102b by generating the third and fourth commands CM3 and CM4, respectively. The fourth transaction is initiated after the initiation of the third transaction. The first processor 102a is further configured to transmit the third and fourth commands CM3 and CM4 to the interconnect 106. For the sake of ongoing discussion, it is assumed that during the execution of the third transaction and prior to the initiation of the fourth transaction, the second fault is detected in the second processor 102b. The interconnect 106 thus transmits the third command CM3 to the second processor 102b before the second fault is detected.

Referring now to FIG. 5A, at step 502, the second fault controller 302 of the second fault recovery system 104b receives at least one of the second and fourth fault signals FS2 and FS4 indicative of the detected second fault from at least one of the second processor 102b and the system controller 112, respectively. As the second fault is detected during the execution of the third transaction, it is assumed that a portion of the third transaction is executed. For example, when the third transaction corresponds to a read transaction, before the second fault is detected, the second processor 102b retrieves the third read data portion R2P1 associated with the third transaction from the first memory, and transmits the retrieved third read data portion R2P1 to the interconnect 106 for providing to the first processor 102a. Similarly, when the third transaction corresponds to a write transaction, before the second fault is detected, the second processor 102b receives the third write data portion W2P1 associated with the third transaction from the interconnect 106, and writes the received third write data portion W2P1 to the second processor 102b.

At step 504, the second fault controller 302 is further configured to generate and transmit the eighth control signal CS8 to the second timer 304 to activate the second timer 304. At step 506, the second fault controller 302 is further configured to enable the second processor 102b to execute (i.e., complete) the third transaction. Further, at step 508, the second fault controller 302 receives, from the interconnect 106, the fourth command CM4 associated with the fourth transaction. At step 510, the second fault controller 302 halts the execution of the fourth transaction. At step 512, the second fault controller 302 generates and transmits, to the interconnect 106, the third control signal CS3 indicative of the halt in the execution of the fourth transaction. The second fault controller 302 executes steps 506, 508, 510, and 512 prior to the reception of the third time-out signal TM3 and after at least one of the second and fourth fault signals FS2 and FS4 are received.

At step 514, the second fault controller 302 determines whether the third transaction is successfully executed by the second processor 102b within the third predetermined time duration. If at step 514, it is determined that the second processor 102b successfully executed the third transaction within the third predetermined time duration, step 516 is performed. At step 516, the second fault controller 302 generates and transmits the fourth control signal CS4 to the second processor 102b to disconnect the second processor 102b from the interconnect 106. At step 518, the second fault controller 302 generates and transmits, until the second processor 102b is reset, the second error response to the interconnect 106 for each subsequent transaction initiated by the first processor 102a with the second processor 102b after the execution of the third transaction.

At step 520, the second fault controller 302 generates and transmits the third status signal SS3 to the system controller 112 to reset the second processor 102b. Based on the second status signal SS2, the system controller 112 generates and transmits the second reset signal RST2 to the second processor 102b. The second processor 102b is reset based on the second reset signal RST2. At step 522, the second diagnostic circuit 306 of the second fault recovery system 104b generates the second diagnostic data DD2 associated with the fault recovery of the second processor 102b, and transmits the second diagnostic data DD2 to the second processor 102b upon the reset of the second processor 102b. Based on the second diagnostic data DD2, the second processor 102b performs various post-recovery operations.

Referring now to FIG. 5B, if at step 514, it is determined that the third transaction is not executed within the third predetermined time duration, step 524 is performed. At step 524, the second fault controller 302 receives the third time-out signal TM3 from the second timer 304. The third time-out signal TM3 is indicative of the failure of the second processor 102b to execute the third transaction after the second fault is detected in the second processor 102b, and is generated when the second timer count is equal to the second threshold value. At step 526, the second fault controller 302 generates and transmits the ninth control signal CS9 to the second timer 304 to activate the second timer 304. At step 528, the second fault controller 302 generates and transmits, based on the third time-out signal TM3, the fourth control signal CS4 to the second processor 102b to disconnect the second processor 102b from the interconnect 106. At step 530, the second fault controller 302 performs, based on the third time-out signal TM3, at least one of the third and fourth operations to execute the third transaction and dequeue the interconnect 106.

When the third transaction corresponds to a read transaction, the second fault controller 302 performs the third operation to execute the third transaction and dequeue the interconnect 106. The third operation corresponds to generation and transmission of the fourth read data portion R2P2 to the interconnect 106 for providing to the first processor 102a. Similarly, when the third transaction corresponds to a write transaction, the second fault controller 302 performs the fourth operation to execute the third transaction and dequeue the interconnect 106. The fourth operation corresponds to a reception of the fourth write data portion W2P2 from the interconnect 106.

At step 532, the second fault controller 302 determines whether the third transaction is successfully executed within the fourth predetermined time duration. If at step 532, it is determined that the third transaction is successfully executed within the fourth predetermined time duration, steps 520 and 522 are performed. If at step 532, it is determined that the third transaction is not executed within the fourth predetermined time duration, step 534 is performed.

At step 534, the second fault controller 302 receives the fourth time-out signal TM4 from the second timer 304. The fourth time-out signal TM4 is indicative of the failure of the second fault controller 302 to execute the third transaction after the second processor 102b has failed to execute the third transaction, and is generated when the second timer count is equal to the second threshold value. At step 536, the second fault controller 302 generates and transmits the fourth status signal SS4 to the system controller 112 to reset the SoC 100.

Thus, when the faulty processor (such as the first and second processors 102a and 102b) fails to execute an ongoing transaction (such as the first and third transactions) after a fault (such as the first and second faults) is detected in the faulty processor, the ongoing transaction is executed (i.e., completed) by the fault recovery system of the present disclosure (such as the first and second fault recovery systems 104a and 104b). Hence, the reliance on the faulty processor to execute the ongoing transaction is eliminated, which in turn, ensures that a fault in one processor leads to an exclusive reset of the corresponding processor, and does not result in a reset of the SoC 100. As a result, a recovery time for a fault detected in one processor of the SoC 100 is significantly less as compared to a recovery time for a fault detected in a processor of an SoC including a conventional fault recovery system that is entirely reliant on a faulty processor to execute (i.e., completing) the ongoing transaction. Consequently, a utilization of the SoC 100 is significantly higher than that of the SoC including the conventional fault recovery system. Thus, the fault recovery system of the present disclosure is more efficient and reliable as compared to the conventional fault recovery system.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. A fault recovery system, comprising:
  a fault controller that is coupled between a first processor and an interconnect, and configured to:
    receive a time-out signal from a timer that is indicative of a failure of the first processor to execute a first transaction after a fault is detected in the first processor, the timer being started in response to detecting the fault and the timer generating the time-out signal if the first processor fails to execute the first transaction before the timer times out, wherein the failure in the execution of the first transaction results in queuing of the interconnect;
    generate and transmit, based on the time-out signal, a first control signal to the first processor to disconnect the first processor from the interconnect;

perform, based on the time-out signal, at least one of first and second operations to execute the first transaction and dequeue the interconnect; and
generate, based on the execution of the first transaction, a status signal to reset the first processor, thereby managing a fault recovery of the first processor.

2. The fault recovery system of claim 1, further comprising the timer that is coupled with the fault controller, and configured to generate a timer count such that the timer count is periodically decremented after a predetermined time duration.

3. The fault recovery system of claim 2, wherein the fault controller is further configured to generate and transmit, after the fault is detected, a second control signal to the timer to activate the timer, wherein the timer is further configured to generate the time-out signal when the timer count is equal to a threshold value, and wherein an equality of the timer count and the threshold value is indicative of the failure of the first processor to execute the first transaction.

4. The fault recovery system of claim 1, further comprising a diagnostic circuit that is coupled with the fault controller, and configured to generate diagnostic data associated with the fault recovery of the first processor that is managed by the fault controller, wherein the diagnostic data includes an identifier, a memory address, and handshake information associated with the first transaction.

5. The fault recovery system of claim 1, wherein the first transaction is initiated by the first processor with at least one of a system memory and a second processor before the fault is detected, and wherein the fault recovery system, the first processor, the interconnect, the system memory, and the second processor are integrated on a system-on-chip.

6. The fault recovery system of claim 5, wherein the fault controller is further configured to receive a first fault signal that is indicative of the fault detected in the first processor, wherein after the first fault signal is received by the fault controller and prior to the reception of the time-out signal by the fault controller, the fault controller is further configured to: (i) enable the first processor to execute the first transaction, (ii) receive a first command associated with a second transaction, (iii) halt an execution of the second transaction, and (iv) generate and transmit, to the first processor, a third control signal that is indicative of the halt in the execution of the second transaction, and wherein the second transaction is initiated by the first processor with at least one of the system memory and the second processor after the fault is detected.

7. The fault recovery system of claim 5, wherein when the first transaction corresponds to a read transaction, the fault controller performs the first operation to execute the first transaction and dequeue the interconnect, wherein the first operation corresponds to a reception of a first portion of first read data associated with the first transaction from the interconnect, and wherein a second portion of the first read data is received by the first processor from the interconnect before the fault is detected.

8. The fault recovery system of claim 5, wherein when the first transaction corresponds to a write transaction, the fault controller performs the second operation to execute the first transaction and dequeue the interconnect, wherein the second operation corresponds to generation and transmission of a first portion of first write data associated with the first transaction to the interconnect to write to at least one of the system memory and the second processor, and wherein a second portion of the first write data is written to at least one of the system memory and the second processor before the fault is detected.

9. The fault recovery system of claim 1, wherein the first transaction is initiated by a second processor with the first processor before the fault is detected, and wherein the fault recovery system, the first processor, the interconnect, and the second processor are integrated on a system-on-chip.

10. The fault recovery system of claim 9, wherein the fault controller is further configured to receive a second fault signal that is indicative of the fault detected in the first processor, wherein after the second fault signal is received by the fault controller and prior to the reception of the time-out signal by the fault controller, the fault controller is further configured to: (i) enable the first processor to execute the first transaction, (ii) receive a second command associated with a third transaction, (iii) halt an execution of the third transaction, and (iv) generate and transmit, to the interconnect, a fourth control signal that is indicative of the halt in the execution of the third transaction, and wherein the third transaction is initiated by the second processor with the first processor after the fault is detected.

11. The fault recovery system of claim 9, wherein when the first transaction corresponds to a read transaction, the fault controller performs the first operation to execute the first transaction and dequeue the interconnect, wherein the first operation corresponds to generation and transmission of a first portion of second read data associated with the first transaction to the interconnect to provide to the second processor, and wherein a second portion of the second read data is provided to the second processor by the first processor before the fault is detected.

12. The fault recovery system of claim 9, wherein when the first transaction corresponds to a write transaction, the fault controller performs the second operation to execute the first transaction and dequeue the interconnect, wherein the second operation corresponds to a reception of a first portion of second write data associated with the first transaction from the interconnect, and wherein a second portion of the second write data is received by the first processor from the interconnect before the fault is detected.

13. A system-on-chip (SoC), comprising:
an interconnect;
a plurality of processors; and
a plurality of fault recovery systems coupled between the plurality of processors and the interconnect such that a first fault recovery system of the plurality of fault recovery systems is coupled between a first processor of the plurality of processors and the interconnect, the first fault recovery system comprising:
a fault controller that is coupled between the first processor and the interconnect, and configured to:
receive a time-out signal from a timer that is indicative of a failure of the first processor to execute a first transaction after a fault is detected in the first processor and the timer being started in response to detecting the fault, the timer generating the time-out signal if the first processor fails to execute the first transaction before the timer times out, wherein the failure in the execution of the first transaction results in queuing of the interconnect;
generate and transmit, based on the time-out signal, a first control signal to the first processor to disconnect the first processor from the interconnect;
perform, based on the time-out signal, at least one of first and second operations to execute the first transaction and dequeue the interconnect; and
generate, based on the execution of the first transaction, a status signal to reset the first processor, thereby managing a fault recovery of the first processor.

14. The SoC of claim 13, wherein the first fault recovery system further includes the timer that is coupled with the fault controller, and wherein:
- the timer is configured to generate a timer count such that the timer count is periodically decremented after a predetermined time duration,
- the fault controller is further configured to generate and transmit, after the fault is detected, a second control signal to the timer to activate the timer,
- the timer is further configured to generate the time-out signal when the timer count is equal to a threshold value, and
- an equality of the timer count and the threshold value is indicative of the failure of the first processor to execute the first transaction.

15. The SoC of claim 13, wherein the first fault recovery system further includes a diagnostic circuit that is coupled with the fault controller, and configured to generate diagnostic data associated with the fault recovery of the first processor that is managed by the fault controller, and wherein the diagnostic data includes an identifier, a memory address, and handshake information associated with the first transaction.

16. The SoC of claim 13, further comprising a system memory, wherein:
- the first transaction is initiated by the first processor with at least one of the system memory and a second processor of the plurality of processors before the fault is detected,
- the fault controller is further configured to receive a first fault signal that is indicative of the fault detected in the first processor,
- after the first fault signal is received by the fault controller and prior to the reception of the time-out signal by the fault controller, the fault controller is further configured to: (i) enable the first processor to execute the first transaction, (ii) receive a first command associated with a second transaction, (iii) halt an execution of the second transaction, and (iv) generate and transmit a third control signal indicative of the halt in the execution of the second transaction to the first processor, and
- the second transaction is initiated by the first processor with at least one of the system memory and the second processor after the fault is detected.

17. The SoC of claim 13, further comprising a system memory, wherein:
- the first transaction is initiated by the first processor with at least one of the system memory and a second processor of the plurality of processors before the fault is detected,
- when the first transaction corresponds to a read transaction, the fault controller performs the first operation to execute the first transaction and dequeue the interconnect, wherein the first operation corresponds to a reception of a first portion of first read data associated with the first transaction from the interconnect, and wherein a second portion of the first read data is received by the first processor from the interconnect before the fault is detected, and
- when the first transaction corresponds to a write transaction, the fault controller performs the second operation to execute the first transaction and dequeue the interconnect, wherein the second operation corresponds to generation and transmission of a first portion of first write data associated with the first transaction to the interconnect to write to at least one of the system memory and the second processor, and wherein a second portion of the first write data is written to at least one of the system memory and the second processor before the fault is detected.

18. The SoC of claim 13, wherein:
- the first transaction is initiated by a second processor of the plurality of processors with the first processor before the fault is detected,
- the fault controller is further configured to receive a second fault signal that is indicative of the fault detected in the first processor,
- after the second fault signal is received by the fault controller and prior to the reception of the time-out signal by the fault controller, the fault controller is further configured to: (i) enable the first processor to execute the first transaction, (ii) receive a second command associated with a third transaction, (iii) halt an execution of the third transaction, and (iv) generate and transmit a fourth control signal indicative of the halt in the execution of the third transaction to the interconnect, and
- the third transaction is initiated by the second processor with the first processor after the fault is detected.

19. The SoC of claim 13, wherein:
- the first transaction is initiated by a second processor of the plurality of processors with the first processor before the fault is detected,
- when the first transaction corresponds to a read transaction, the fault controller performs the first operation to execute the first transaction and dequeue the interconnect, wherein the first operation corresponds to generation and transmission of a first portion of second read data associated with the first transaction to the interconnect to provide to the second processor, and wherein a second portion of the second read data is provided to the second processor by the first processor before the fault is detected, and
- when the first transaction corresponds to a write transaction, the fault controller performs the second operation to execute the first transaction and dequeue the interconnect, wherein the second operation corresponds to a reception of a first portion of second write data associated with the first transaction from the interconnect, and wherein a second portion of the second write data is received by the first processor from the interconnect before the fault is detected.

20. A fault recovery method, comprising:
- receiving, by a fault recovery system that is coupled between a first processor and an interconnect, a time-out signal from a timer that is indicative of a failure of the first processor to execute a first transaction after a fault is detected in the first processor, the timer being started in response to detecting the fault and the timer generating the time-out signal if the first processor fails to execute the first transaction before the timer times out, wherein the failure in the execution of the first transaction results in queuing of the interconnect;
- generating and transmitting, based on the time-out signal, by the fault recovery system, a first control signal to the first processor to disconnect the first processor from the interconnect;
- performing, based on the time-out signal, by the fault recovery system, at least one of first and second operations to execute the first transaction and dequeue the interconnect; and
- generating, based on the execution of the first transaction, by the fault recovery system, a status signal to reset the first processor.

21. The fault recovery of claim 1, wherein after the first fault signal is received by the fault controller and prior to the reception of the time-out signal by the fault controller, the fault controller is further configured to: (i) enable the first processor to execute the first transaction, (ii) receive a first command associated with a second transaction, (iii) halt an execution of the second transaction, wherein the second transaction is initiated by the first processor after the fault is detected with at least one of a system memory and a second processor.

22. The SoC of claim 13, wherein after the first fault signal is received by the fault controller and prior to the reception of the time-out signal by the fault controller, the fault controller is further configured to: (i) enable the first processor to execute the first transaction, (ii) receive a first command associated with a second transaction, (iii) halt an execution of the second transaction, wherein the second transaction is initiated by the first processor after the fault is detected with at least one of a system memory and a second processor.

23. The fault recovery method of claim 20, wherein after a first fault signal is received by the fault recovery system and prior to the reception of the time-out signal by the fault recovery system, the fault recovery system is further configured to: (i) enable the first processor to execute the first transaction, (ii) receive a first command associated with a second transaction, (iii) halt an execution of the second transaction, wherein the second transaction is initiated by the first processor after the fault is detected with at least one of a system memory and a second processor.

* * * * *